(12) United States Patent
Sorin et al.

(10) Patent No.: US 11,745,346 B2
(45) Date of Patent: Sep. 5, 2023

(54) MOTION PLANNING OF A ROBOT STORING A DISCRETIZED ENVIRONMENT ON ONE OR MORE PROCESSORS AND IMPROVED OPERATION OF SAME

(71) Applicant: Realtime Robotics, Inc., Boston, MA (US)

(72) Inventors: Daniel Sorin, Boston, MA (US); George Konidaris, Boston, MA (US); Sean Murray, Boston, MA (US); William Floyd-Jones, Boston, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 45 days.

(21) Appl. No.: 17/532,648

(22) Filed: Nov. 22, 2021

(65) Prior Publication Data

US 2022/0080594 A1 Mar. 17, 2022

Related U.S. Application Data

(63) Continuation of application No. 16/268,290, filed on Feb. 5, 2019, now Pat. No. 11,235,465.
(Continued)

(51) Int. Cl.
*B25J 9/16* (2006.01)
*G05D 1/02* (2020.01)

(52) U.S. Cl.
CPC .......... *B25J 9/1666* (2013.01); *B25J 9/1671* (2013.01); *G05D 1/0214* (2013.01); *G05B 2219/40448* (2013.01)

(58) Field of Classification Search
CPC ...... B25J 9/1666; B25J 9/1671; B25J 9/1676; G05D 1/0214; G05B 2219/40448; G05B 2219/40442; G05B 2219/40446
See application file for complete search history.

(56) References Cited

U.S. PATENT DOCUMENTS 4,163,183 A 7/1979 Dunne et al.
4,300,198 A 11/1981 Davini
(Continued)

FOREIGN PATENT DOCUMENTS

CN 101837591 A 9/2010
CN 102814813 A 12/2012
(Continued)

OTHER PUBLICATIONS

Hassan, "Modeling and Stochastic Optimization of Complete Coverage under Uncertainties in Multi-Robot Base Placements," 2016, Intelligent Robots and Systems (IROS} (Year: 2016).
(Continued)

*Primary Examiner* — Robert T Nguyen
*Assistant Examiner* — Dylan M Katz
(74) *Attorney, Agent, or Firm* — Cozen O'Connor

(57) ABSTRACT

A robot control system determines which of a number of discretizations to use to generate discretized representations of robot swept volumes and to generate discretized representations of the environment in which the robot will operate. Obstacle voxels (or boxes) representing the environment and obstacles therein are streamed into the processor and stored in on-chip environment memory. At runtime, the robot control system may dynamically switch between multiple motion planning graphs stored in off-chip or on-chip memory. The dynamically switching between multiple motion planning graphs at runtime enables the robot to perform motion planning at a relatively low cost as characteristics of the robot itself change.

15 Claims, 11 Drawing Sheets

Related U.S. Application Data

(60) Provisional application No. 62/626,939, filed on Feb. 6, 2018.

(56) References Cited

U.S. PATENT DOCUMENTS

| | | |
|---|---|---|
| 4,862,373 A * | 8/1989 | Meng ............... G01C 21/3878 |
| | | 701/410 |
| 4,949,277 A | 8/1990 | Trovato et al. |
| 5,347,459 A | 9/1994 | Greenspan et al. |
| 5,544,282 A | 8/1996 | Chen et al. |
| 6,004,016 A | 12/1999 | Spector |
| 6,049,756 A | 4/2000 | Libby |
| 6,089,742 A | 7/2000 | Warmerdam et al. |
| 6,259,988 B1 | 7/2001 | Galkowski et al. |
| 6,470,301 B1 | 10/2002 | Barral |
| 6,493,607 B1 | 12/2002 | Bourne et al. |
| 6,526,372 B1 | 2/2003 | Orschel et al. |
| 6,526,373 B1 | 2/2003 | Barral |
| 6,529,852 B2 | 3/2003 | Knoll et al. |
| 6,539,294 B1 | 3/2003 | Kageyama |
| 6,671,582 B1 | 12/2003 | Hanley |
| 7,577,498 B2 | 8/2009 | Jennings et al. |
| 7,609,020 B2 | 10/2009 | Kniss et al. |
| 7,865,277 B1 | 1/2011 | Larson et al. |
| 7,940,023 B2 | 5/2011 | Kniss et al. |
| 8,082,064 B2 | 12/2011 | Kay |
| 8,315,738 B2 | 11/2012 | Chang et al. |
| 8,571,706 B2 | 10/2013 | Zhang et al. |
| 8,666,548 B2 | 3/2014 | Lim |
| 8,825,207 B2 | 9/2014 | Kim et al. |
| 8,825,208 B1 | 9/2014 | Benson |
| 8,855,812 B2 | 10/2014 | Kapoor |
| 8,880,216 B2 | 11/2014 | Izumi et al. |
| 8,972,057 B1 | 3/2015 | Freeman et al. |
| 9,092,698 B2 | 7/2015 | Buehler et al. |
| 9,102,055 B1 | 8/2015 | Konolige et al. |
| 9,227,322 B2 | 1/2016 | Graca et al. |
| 9,280,899 B2 | 3/2016 | Biess et al. |
| 9,327,397 B1 | 5/2016 | Williams et al. |
| 9,333,044 B2 | 5/2016 | Olson |
| 9,434,072 B2 | 9/2016 | Buehler et al. |
| 9,539,058 B2 | 1/2017 | Tsekos et al. |
| 9,632,502 B1 | 4/2017 | Levinson et al. |
| 9,645,577 B1 | 5/2017 | Frazzoli et al. |
| 9,687,982 B1 | 6/2017 | Jules et al. |
| 9,687,983 B1 | 6/2017 | Prats |
| 9,701,015 B2 | 7/2017 | Buehler et al. |
| 9,707,682 B1 | 7/2017 | Konolige et al. |
| 9,731,724 B2 | 8/2017 | Yoon |
| 9,981,382 B1 | 5/2018 | Strauss et al. |
| 9,981,383 B1 | 5/2018 | Nagarajan |
| 10,035,266 B1 | 7/2018 | Kroeger |
| 10,099,372 B2 | 10/2018 | Vu et al. |
| 10,124,488 B2 | 11/2018 | Lee et al. |
| 10,131,053 B1 | 11/2018 | Sampedro et al. |
| 10,300,605 B2 | 5/2019 | Sato |
| 10,430,641 B2 | 10/2019 | Gao |
| 10,705,528 B2 | 7/2020 | Wierzynski et al. |
| 10,723,024 B2 * | 7/2020 | Konidaris ............... G06N 7/01 |
| 10,782,694 B2 | 9/2020 | Zhang et al. |
| 10,792,114 B2 | 10/2020 | Hashimoto et al. |
| 10,959,795 B2 | 3/2021 | Hashimoto et al. |
| 11,358,337 B2 | 6/2022 | Czinger et al. |
| 2002/0013675 A1 | 1/2002 | Knoll et al. |
| 2002/0074964 A1 | 6/2002 | Quaschner et al. |
| 2003/0155881 A1 | 8/2003 | Hamann et al. |
| 2004/0249509 A1 | 12/2004 | Rogers et al. |
| 2005/0071048 A1 | 3/2005 | Watanabe et al. |
| 2005/0216181 A1 | 9/2005 | Estkowski et al. |
| 2006/0235610 A1 | 10/2006 | Ariyur et al. |
| 2006/0247852 A1 | 11/2006 | Kortge et al. |
| 2007/0106422 A1 | 5/2007 | Jennings et al. |
| 2007/0112700 A1 | 5/2007 | Den et al. |
| 2008/0012517 A1 | 1/2008 | Kniss et al. |
| 2008/0125893 A1 | 5/2008 | Tilove et al. |
| 2008/0186312 A1 | 8/2008 | Ahn et al. |
| 2008/0234864 A1 | 9/2008 | Sugiura et al. |
| 2009/0055024 A1 | 2/2009 | Kay |
| 2009/0192710 A1 | 7/2009 | Eidehall et al. |
| 2009/0295323 A1 | 12/2009 | Papiernik et al. |
| 2009/0326711 A1 | 12/2009 | Chang et al. |
| 2009/0326876 A1 | 12/2009 | Miller |
| 2010/0145516 A1 | 6/2010 | Cedoz et al. |
| 2010/0235033 A1 | 9/2010 | Yamamoto et al. |
| 2011/0066282 A1 | 3/2011 | Bosscher et al. |
| 2011/0153080 A1 | 6/2011 | Shapiro et al. |
| 2012/0010772 A1 | 1/2012 | Pack et al. |
| 2012/0083964 A1 | 4/2012 | Montemerlo et al. |
| 2012/0215351 A1 | 8/2012 | McGee et al. |
| 2012/0297733 A1 | 11/2012 | Pierson et al. |
| 2012/0323357 A1 | 12/2012 | Izumi et al. |
| 2013/0346348 A1 | 12/2013 | Buehler et al. |
| 2014/0012419 A1 | 1/2014 | Nakajima |
| 2014/0025201 A1 | 1/2014 | Ryu et al. |
| 2014/0025203 A1 | 1/2014 | Inazumi |
| 2014/0058406 A1 | 2/2014 | Tsekos |
| 2014/0067121 A1 | 3/2014 | Brooks et al. |
| 2014/0079524 A1 | 3/2014 | Shimono et al. |
| 2014/0121833 A1 | 5/2014 | Lee et al. |
| 2014/0121837 A1 | 5/2014 | Hashiguchi et al. |
| 2014/0147240 A1 | 5/2014 | Noda et al. |
| 2014/0156068 A1 | 6/2014 | Graca et al. |
| 2014/0249741 A1 | 9/2014 | Levien et al. |
| 2014/0251702 A1 | 9/2014 | Berger et al. |
| 2014/0309916 A1 | 10/2014 | Bushnell |
| 2015/0005785 A1 | 1/2015 | Olson |
| 2015/0037131 A1 | 2/2015 | Girtman et al. |
| 2015/0051783 A1 | 2/2015 | Tamir et al. |
| 2015/0134111 A1 | 5/2015 | Nakajima |
| 2015/0261899 A1 | 9/2015 | Atohira et al. |
| 2015/0266182 A1 | 9/2015 | Strandberg |
| 2016/0001775 A1 | 1/2016 | Wilhelm et al. |
| 2016/0107313 A1 | 4/2016 | Hoffmann et al. |
| 2016/0112694 A1 | 4/2016 | Nishi et al. |
| 2016/0121487 A1 | 5/2016 | Mohan et al. |
| 2016/0154408 A1 | 6/2016 | Eade et al. |
| 2016/0299507 A1 | 10/2016 | Shah et al. |
| 2016/0324587 A1 | 11/2016 | Olson |
| 2016/0357187 A1 | 12/2016 | Ansari |
| 2017/0004406 A1 | 1/2017 | Aghamohammadi |
| 2017/0028559 A1 | 2/2017 | Davidi et al. |
| 2017/0120448 A1 | 5/2017 | Lee et al. |
| 2017/0123419 A1 | 5/2017 | Levinson et al. |
| 2017/0132334 A1 | 5/2017 | Levinson et al. |
| 2017/0146999 A1 | 5/2017 | Cherepinksy et al. |
| 2017/0157769 A1 | 6/2017 | Aghamohammadi et al. |
| 2017/0168485 A1 | 6/2017 | Berntorp et al. |
| 2017/0168488 A1 | 6/2017 | Wierzynski et al. |
| 2017/0193830 A1 | 7/2017 | Fragoso et al. |
| 2017/0210008 A1 | 7/2017 | Maeda |
| 2017/0305015 A1 | 10/2017 | Krasny et al. |
| 2018/0001472 A1 | 1/2018 | Konidaris et al. |
| 2018/0001476 A1 | 1/2018 | Tan et al. |
| 2018/0029233 A1 | 2/2018 | Lager |
| 2018/0074505 A1 | 3/2018 | Lv et al. |
| 2018/0113468 A1 | 4/2018 | Russell |
| 2018/0136662 A1 | 5/2018 | Kim |
| 2018/0150077 A1 | 5/2018 | Danielson et al. |
| 2018/0172450 A1 | 6/2018 | Lalonde et al. |
| 2018/0173242 A1 | 6/2018 | Lalonde et al. |
| 2018/0189683 A1 | 7/2018 | Newman |
| 2018/0222051 A1 | 8/2018 | Vu et al. |
| 2018/0229368 A1 | 8/2018 | Leitner et al. |
| 2018/0281786 A1 | 10/2018 | Oyaizu et al. |
| 2018/0339456 A1 | 11/2018 | Czinger et al. |
| 2019/0143518 A1 | 5/2019 | Maeda |
| 2019/0163191 A1 | 5/2019 | Sorin et al. |
| 2019/0164430 A1 | 5/2019 | Nix |
| 2019/0196480 A1 | 6/2019 | Taylor |
| 2019/0232496 A1 * | 8/2019 | Graichen ............... B25J 9/1666 |
| 2019/0262993 A1 | 8/2019 | Cole et al. |
| 2019/0293443 A1 | 9/2019 | Kelly et al. |
| 2019/0391597 A1 | 12/2019 | Dupuis |

(56) References Cited

U.S. PATENT DOCUMENTS

| | | |
|---|---|---|
| 2020/0069134 A1 | 3/2020 | Ebrahimi Afrouzi et al. |
| 2020/0097014 A1 | 3/2020 | Wang |
| 2020/0331146 A1 | 10/2020 | Vu et al. |
| 2020/0338730 A1 | 10/2020 | Yamauchi et al. |
| 2020/0338733 A1 | 10/2020 | Dupuis et al. |
| 2020/0353917 A1 | 11/2020 | Leitermann et al. |
| 2020/0368910 A1 | 11/2020 | Chu et al. |
| 2021/0009351 A1 | 1/2021 | Beinhofer et al. |
| 2022/0339875 A1 | 10/2022 | Czinger et al. |

FOREIGN PATENT DOCUMENTS

| | | |
|---|---|---|
| CN | 106660208 A | 5/2017 |
| CN | 107206592 | 9/2017 |
| EP | 1901150 A1 | 3/2008 |
| EP | 2306153 A2 | 4/2011 |
| EP | 3250347 A1 | 12/2017 |
| EP | 3486612 A1 | 5/2019 |
| EP | 3725472 A1 | 10/2020 |
| JP | 11296229 A | 10/1999 |
| JP | 2002073130 A | 3/2002 |
| JP | 2003127077 A | 5/2003 |
| JP | 2005032196 A | 2/2005 |
| JP | 2006224740 A | 8/2006 |
| JP | 2007257274 A | 10/2007 |
| JP | 2008065755 A | 3/2008 |
| JP | 2010061293 A | 3/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| JP | 2017131973 A | 8/2017 |
| JP | 2018505788 A | 3/2018 |
| KR | 19980024584 A | 7/1998 |
| KR | 20110026776 A | 3/2011 |
| KR | 20130112507 A | 10/2013 |
| KR | 20170018564 A | 2/2017 |
| KR | 20170044987 A | 4/2017 |
| KR | 20170050166 A | 5/2017 |
| KR | 20180125646 A | 11/2018 |
| TW | 201318793 A | 5/2013 |
| WO | 9924914 A1 | 5/1999 |
| WO | 2015113203 A1 | 8/2015 |
| WO | 2016122840 A1 | 8/2016 |
| WO | 2017168187 A1 | 10/2017 |
| WO | 2017214581 A1 | 12/2017 |
| WO | 2019183141 A1 | 9/2019 |
| WO | 2020040979 A1 | 2/2020 |
| WO | 2020117958 A1 | 6/2020 |

OTHER PUBLICATIONS

Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).

Hassan, et al., "Simultaneous area partitioning and allocation for complete coverage by multiple autonomous industrial robots," 2017, Autonomous Robots 41, pp. 1609-1628 (Year: 2017).

Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.

Kalawoun, "Motion planning of multi-robot system for airplane stripping," 2019, Universite Clermont Auvergne (Year: 2019).

Kapanoglu, et al., "A pattern-based genetic algorithm for multi-robot coverage path planning minimizing completion time," 2012, Journal of Intelligent Manufacturing 23, pp. 1035-1045 (Year: 2012).

Notice of Allowance for U.S. Appl. No. 17/153,662, dated Dec. 6, 2022, 15 pages.

Pires, et al., "Robot Trajectory Planning Using Multi-objective Genetic Algorithm Optimization," 2004, Genetic and Evolutionary Computation—GECCO 2004, pp. 615-626 (Year: 2004).

Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.

Extended EP Search Report dated Nov. 7, 2022, EP App No. 21744840.6-1205, 14 pages.

Klampfl Erica et al: "Optimization of workcell layouts in a mixed-model assembly line environment", International Journal of Flexible Manufacturing Systems, Kluwer Academic Publishers, Boston, vol. 17, No. 4, 23 pages., Oct. 10, 2006.

Long Tao et al: "Optimization on multi-robot workcell layout in vertical plane", Information and Automation (ICIA), 2011 IEEE International Conference ON, IEEE, Jun. 6, 2011, 6 pages.

Pashkevich AP et al: "Muitiobjective optimisation of robot location in a workcell using genetic algorithms", Control '98. UKACC International Conference on (Conf. Publ. No. 455) Swansea, UK Sep. 1-4, 1998, London, UK, vol. 1, Sep. 1, 1998, 6 pages.

Zhen Yang et al.: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.

International Search Report and Written Opinion for PCT/US2021/061427, dated Apr. 29, 2022, 14 pages.

Non-Final Office Action Issued in U.S. Appl. No. 16/909,096 dated May 6, 2022, 49 pages.

Final Office Action dated Aug. 2, 2021 for U.S. Appl. No. 16/240,086, 66 pages.

European Search Report dated Jul. 23, 2021, for European Application No. 19851097.6, 15 pages.

Taiwanese First Office Action—Application No. 106119452 dated Jun. 18, 2021, 25 pages.

Corrales, J.A., et al., Safe Human-robot interaction based on dynamic sphere-swept line bounding volumes Robotic and Computer-Integrated Manufacturing 27 (2011) 177-185, 9 pages.

Pobil, Angel P, et al., "A New Representation for Collision Avoidance and Detection", Proceedings of the 1992 IEEE, XP000300485, pp. 246-251.

Sato, Yuichi, et al., "Efficient Collision Detection using Fast Distance-Calculation Algorithms for Convex and Non-Convex Objects", Proceeding of the 1996 IEEE, XP-000750294, 8 pages.

Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.

Non-Final Office Action Issued in U.S. Appl. No. 16/308,693, dated May 14, 2021, 16 pages.

European Search Report issued in European Application No. 19771537.8, dated Mar. 29, 2021, 8 pages.

Murray, Sean, et al., "Robot Motion Planning on a Chip", Robotics: Science and Systems, Jan. 1, 2016, 9 pages.

Rodriguez, Carlos, et al., "Planning manipulation movements of a dual-arm system considering obstacle removing", Robotics and Autonomous Systems 62 (2014), Elsevier, Journal homepage: www.elsevier.com/locate/robot, pp. 1816-1826.

Non-Final Office Action Issued in U.S. Appl. No. 16/240,086, dated Feb. 11, 2021, 79 pages.

Communication Pursuant to Article 94(3) EPC, issued in European Application No. 18209405.2, dated Nov. 23, 2020, 4 pages.

European Search Report dated Nov. 17, 2020 for EP Application No. 16743821.7, 4 pages.

Non-Final Office Action Issued in U.S. Appl. No. 16/308,693, dated Dec. 11, 2020, 17 pages.

European Search Report issued in European Application No. 17811131.6, dated Jun. 16, 2020, 5 pages.

(56) References Cited

OTHER PUBLICATIONS

First Office Action issued in Chinese No. 201680006941.3 with English translation, dated Sep. 29, 2019, 16 pages.
International Search Report and Written Opinion for PCT/US2019/023031 dated Aug. 31, 2019, 18 pages.
International Search Report and Written Opinion for PCT/US2019/064511, dated Mar. 27, 2020, 10 pages.
International Search Report and Written Opinion issued in PCT Application No. PCT/2020/034551, dated Aug. 31, 2020, 18 pages.
International Search Report and Written Opinion, dated Jun. 23, 2020 for PCT/US2020/039193, 9 pages.
Non-Final Office Action Issued in U.S. Appl. No. 16/308,693, dated Jun. 1, 2020, 16 pages.
Non-Final Office Action Issued in U.S. Appl. No. 15/546,441, dated Sep. 17, 2019, 58 Pages.
Office Action Issued in Japanese Application No. 2018-564836, dated Dec. 3, 2019, 3 Pages.
Office Action Issued in Japanese Application No. 2018-564836, dated May 19, 2020, 3 Pages.
Office Action with English translation Issued in Japanese Application No. 2018-564836, dated Nov. 29, 2019, 7 pages.
International Search Report and Written Opinion issued in PCT Application No. PCT/US2019/045270; dated Nov. 25, 2019, 11 pages.
Johnson, Davide., et al., "Bound Coherence for Minimum Distance Computations", Proceedings of the 1999 IEEE International Conference on Robotics and Automation, May 1999.
Stilman, Mike, et al., "Manipulation Planning Among Movable Obstacles", Proceedings of the IEEE Int. Conf. on Robotics and Automation, Apr. 2007.
Extended European Search Report dated Apr. 10, 2018 for EP Application No. 16743821.7, in 9 pages.
Extended European Search Report issued in European Application No. 17811131.6, dated Apr. 24, 2019, 16 pages.
Extended European Search Report issued in European Application No. 18209405.2, dated Aug. 2, 2019, 9 pages.
First Office Action issued in Japanese Patent Application No. 2017-557268, dated Aug. 7, 2018, 15 pages.
International Search Report and Written Opinion for PCT/US2019/023031 dated Aug. 14, 2019 in 19 pages.
International Search Report and Written Opinion issued in PCT Application No. PCT/US2016/012204; dated Mar. 21, 2016, 10 pages.
International Search Report and Written Opinion issued in PCT Application No. PCT/US2017/036880; dated Oct. 10, 2017, 15 pages.
International Search Report and Written Opinion issued in PCT/US2019/012209, dated Apr. 25, 2019, 24 pages.
Invitation to Pay Additional Fees and, Where Applicable, Protest Fee issued in PCT/US2017/036880, dated Aug. 14, 2017, 2 pages (no copy available).
(Or I Definition of Or by Merriam-Webster, Sep. 9, 2019, https://www.merriam-webster.com/dictionary/or, pp. 1-12; Year: 2019.
Second Office Action issued in Japanese Patent Application No. 2017-557268, dated Feb. 26, 2019, 5 Pages.
Atay, Nuzhet, et al., "A Motion Planning Processor on Reconfigurable Hardware", All Computer Science and Engineering Research, Computer Science and Engineering; Report No. WUCSE-2005-46; Sep. 23, 2005.
Hauck, Scott, et al., "Configuration Compression for the Xilinx XC6200 FPGA", IEEE Transactions on Computer-Aided Design of Integrated Circuits and Systems, vol. 18, No. 8; Aug. 1999.
Kavraki, L.E., et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Murray, Sean, et al., "Robot Motion Planning on a Chip", Robotics: Science and Systems 2016; Jun. 22, 2016; 9 Pages.

Murray, Sean, et al., "The microarchitecture of a real-time robot motion planning accelerator", 2016 49th Annual IEEE/ACM International Symposium on Microarchitecture (Micro), IEEE, Oct. 15, 2016, 12 pages.
Rodriguez, Carlos, et al., "Planning manipulation movements of a dual-arm system considering obstacle removing", Robotics and Autonomous Systems, Elsevier Science Publishers, vol. 62, No. 12, pp. 1816-1826; Aug. 1, 2014.
International Search Report and Written Opinion for PCT/US2019/016700 dated May 20, 2019,14 pages.
Notice of Reasons for Rejection dated Feb. 16, 2023, for Japanese Application No. 2021-571340, 10 pages.
Office Action issued in Taiwan Application No. 108104094, dated Feb. 6, 2023, 24 pages.
Bharathi Akilan et al.: "Feedrate optimization for smooth minimum-time trajectory generation with higher order constraints", The International Journal of Advanced Manufacturing Technology,vol. 82, No. 5, Jun. 28, 2015 (Jun. 28, 2015), pp. 1029-1040.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
Extended EP Search Report dated Jul. 18, 2022 EP App No. 20832308.9-1205, 10 pages.
Extended EP Search Report dated Jul. 25, 2022 EP App No. 20857383.2-1205, 10 pages.
S. Saravana Perumaal et al: "Automated Trajectory Planner of Industrial Robot for Pick-and-Place Task", International Journal of Advanced Robotic Systems, vol. 10, No. 2, Jan. 1, 2013.
Final Office Action dated Sep. 7, 2022, for U.S. Appl. No. 16/909,096, 54 pages.
Gasparetto A et al: "Experimental validation and comparative analysis of optimal time-jerk algorithms for trajectory planning", Robotics and Computer Integrated Manufacturing, Elsevier Science Publishers BV., Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Lin Jianjie et al: "An Efficient and Time-Optimal trajectory Generation Approach for Waypoints Under Kinematic Constraints and Error Bounds", 2018 IEEE/RSJ International Conference on Intelligent Robots and Systems (IROS), IEEE, Oct. 1, 2018.
Non-Final Office Action for U.S. Appl. No. 16/883,376, dated Sep. 27, 2022, 26 pages.
Non-Final Office Action dated Sep. 14, 2022, for U.S. Appl. No. 16/999,339, 18 pages.
Sonja Macfarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Ratliff. et al., "CHOMP: Gradient Optimization Techniques for Efficient Motion Pianning", 2009 IEEE International Conferenced on Robotics and Automation, Kobe, Japan; May 12-17, 2009, 6 pages.
First Office Action issued in Chinese No. 201980024188.4 with English translation, dated Feb. 22, 2023, 28 pages.
Non-Final Office Action Issued in U.S. Appl. No. 16/981,467, dated Mar. 16, 2023, 19 Pages.
Notice of Reasons for Rejection dated Feb. 7, 2023, for Japanese Application No. 2022-054900, 7 pages.
Final Office Action Issued in U.S. Appl. No. 16/268,290, dated Apr. 21, 2021, 58 pages.
Non-Final Office Action Issued in U.S. Appl. No. 16/268,290, dated Jan. 27, 2021, 54 pages.
Non-Final Office Action Issued in Application No. 16/268.290, dated Jun. 17, 2021, 35 pages.

(56) References Cited

OTHER PUBLICATIONS

Notice of Allowance dated Sep. 24, 2021, for Ritchey, "Motion Planning of a Robot Storing a Discretized Environment on One or More Processors and Improved Operation of Same," U.S. Appl. No. 16/268,290, 8 pages.
Office Action Issued in Japanese Application No. 2021-171704, dated Jan. 28, 2022, 3 Pages.
Office Action Issued in Japanese Application No. 2021-171726, dated Jan. 26, 2022, 4 Pages.
Sicilliano et al. "Robotics. Modelling, Planning and Control", Chapter 12: Motion Planning, pp. 523-559, 2009.
Chen, Chao, Motion Planning for Nonholonomic Vehicles with Space Exploration Guided Heuristic Search, 2016, IEEE.com, Whole Document, 140 pages.
Pan, Jia, et al., Efficient Configuration Space Construction and Optimization for Motion Planning, 2015, Research Robotics, Whole Document, 12 pages.
Japanese Office Action, Japanese Application No. 2021-576425, dated Mar. 13, 2023, 14 pages.

\* cited by examiner

MOTION PLANNING OF A ROBOT STORING A DISCRETIZED ENVIRONMENT ON ONE OR MORE PROCESSORS AND IMPROVED OPERATION OF SAME

TECHNICAL FIELD

The present disclosure generally relates to robot motion planning, and in particular to systems and methods that facilitate motion planning of a robot storing a discretized representation of the environment on one or more processors.

BACKGROUND

Description of the Related Art

Motion planning is a fundamental problem in robot control and robotics. A motion plan completely specifies a path a robot can follow from a starting state to a goal state, typically without colliding with any obstacles in an operational environment or with a reduced possibility of colliding with any obstacles in the operational environment. Challenges to motion planning involve the ability to perform motion planning at a relatively low cost and very fast speeds even as characteristics of the robot itself change. For example, such characteristics may include the volume considered occupied by the robot when the robot is holding objects of various sizes, when changing to a different end effector or when changing to a different appendage. Also, there are also challenges with respect to a limited amount of motion planning information that could be stored on processor chip circuitry.

BRIEF SUMMARY

A method of operation in a robot control system may be summarized as including: for a first robot that will operate in an environment, determining a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states are represented by respective ones of a pair of nodes that are coupled by a respective edge in the respective planning graph; for at least two or more of the edges of each of the planning graphs, generating a respective set of edge information that represents a volume swept by at least a portion of the first robot in transitioning between the states represented by the respective nodes that are coupled by the respective edge; storing the plurality of planning graphs and the sets of edge information in at least one nontransitory processor-readable storage; based on at least a portion of the first robot having a first set of physical dimensions at a first time, providing the sets of edge information for a first one of the planning graphs to at least one processor; and based on at least a portion of the first robot having a second set of physical dimensions at a second time, at least one dimension in the second set of physical dimensions different than a corresponding one of the dimensions of the first set, providing the sets of edge information for a second one of the planning graphs to the at least one processor.

The first robot may have at least a first appendage that is selectively operable for movement with respect to the environment in which the first robot operates, and the first robot may have a first end effector attached to the first appendage, the first end effector selectively operable for movement between at least a first and a second end effector arrangements, and may further include determining that the first end effector attached to the first appendage is in a first end effector arrangement, wherein the first set of physical dimensions represent a set of dimensions of the first end effector in the first end effector arrangement; and wherein providing the sets of edge information for a first one of the planning graphs to at least one processor may be in response to the determination that the first end effector attached to the first appendage is in the first end effector arrangement.

The method of operation in a robot control system may further include: determining that the first end effector attached to the first appendage is in a second end effector arrangement, wherein the second set of physical dimensions represents a set of dimensions of the first end effector in the second end effector arrangement; and wherein providing the sets of edge information for a second one of the planning graphs to at least one processor is in response to the determination that the first end effector attached to the first appendage is in the second end effector arrangement.

The first robot may have at least a first appendage that is selectively operable for movement with respect to the environment in which the first robot operates, and a first end effector may be attached to the first appendage, the first end effector selectively operable for movement between at least an un-grasped arrangement and a grasped arrangement, at least one of a size or shape of a volume occupied by the first end effector in the grasped arrangement being different from at least one of a size or shape of a volume occupied by the first end effector in the un-grasped arrangement, and may further include determining that the first end effector attached to the first appendage is in the un-grasped arrangement; wherein providing the sets of edge information for a first one of the planning graphs to at least one processor may be in response to the determination that the first end effector attached to the first appendage is in the un-grasped arrangement; and determining that the first end effector attached to the first appendage may be in the grasped arrangement; wherein providing the sets of edge information for a second one of the planning graphs to at least one processor may be in response to the determination that the first end effector attached to the first appendage is in grasped arrangement. The first robot may have at least a first appendage that is selectively operable for movement with respect to the environment in which the first robot operates, and, may further include determining that the first robot has a first end effector attached to the first appendage, wherein the first set of physical dimensions may represent a set of dimensions of the first end effector attached to the first appendage; and wherein providing the sets of edge information for a first one of the planning graphs to at least one processor may be in response to the determination that the first robot has a first end effector attached to the first appendage.

The method of operation in a robot control system may further include determining that the first robot has a second end effector attached to the first appendage, the second end effector different from the first end effector in at least one of shape or size, wherein the second set of physical dimensions may represent a set of dimensions of the second end effector attached to the first appendage; and wherein providing the sets of edge information for a second one of the planning graphs to at least one processor may be in response to the determination that the first robot has a second end effector attached to the first appendage.

The first robot may be at least one of an autonomous or semi-autonomous vehicle, at least one of a size or shape of a volume occupied by the at least one of an autonomous or semi-autonomous vehicle in a first physical state may be different from at least one of a size or shape of a volume occupied by the at least one of an autonomous or semi-autonomous vehicle in the second physical state (e.g., weight may change due to consumption of fuel, hence velocity may change and distance traveled changes), and may further include determining that the at least one of an autonomous or semi-autonomous vehicle is in the first physical state; wherein providing the sets of edge information for a first one of the planning graphs to at least one processor may be in response to the determination that the at least one of an autonomous or semi-autonomous vehicle is in the first physical state; and determining that the at least one of an autonomous or semi-autonomous vehicle may be in the second physical state; wherein providing the sets of edge information for a second one of the planning graphs to at least one processor may be in response to the determination that the at least one of an autonomous or semi-autonomous vehicle is in second physical state. Providing the sets of edge information for a first one of the planning graphs to at least one processor may include applying the edge information for one of the edges to each of a plurality of circuits of the at least one processor to determine which edges collide with a unit volume occupied by an obstacle in the environment in which the robot operates. Providing the sets of edge information for a first one of the planning graphs to at least one processor may include applying the edge information for one of the edges to each of a plurality of circuits of the at least one processor in parallel. Generating a respective set of edge information that represents a volume swept by at least a portion of the first robot in transitioning between the states represented by the respective nodes that are coupled by the respective edge may include generating a respective set of edge information that represents in terms of voxels a volume swept by at least a portion of the first robot in transitioning between the states represented by the respective nodes that are coupled by the respective edge. Generating a respective set of edge information that represents a volume swept by at least a portion of the first robot in transitioning between the states represented by the respective nodes that are coupled by the respective edge may include generating a respective set of edge information that represents in terms of units of volume, the units of volume that cover two or more voxels, a volume swept by at least a portion of the first robot in transitioning between the states represented by the respective nodes that are coupled by the respective edge. Generating a respective set of edge information that represents a volume swept by at least a portion of the first robot in transitioning between the states represented by the respective nodes that are coupled by the respective edge may include generating a respective set of edge information that represents in terms of rectangular prisms (parallelepiped) a volume swept by at least a portion of the first robot in transitioning between the states represented by the respective nodes that are coupled by the respective edge. Generating a respective set of edge information that represents in terms of rectangular prisms (parallelepiped) a volume swept by at least a portion of the first robot in transitioning between the states represented by the respective nodes that are coupled by the respective edge may include, for each of the rectangular prisms, storing a pair of three dimensional coordinates that completely define the volume of the respective rectangular prism. The determining a plurality of planning graphs and the generating a respective set of edge information may be performed during a pre-run time period. The providing the sets of edge information for a second one of the planning graphs to the at least one processor may be performed during a run time period.

A processor-based robot control system may be summarized as including: at least one processor; and at least one nontransitory processor-readable medium that stores at least one of processor-executable instructions or data which, when executed by the at least one processor, causes the at least one processor to: for a first robot that will operate in an environment, determine a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states are represented by respective ones of a pair of nodes that are coupled by a respective edge in the respective planning graph; for at least two or more of the edges of each of the planning graphs, generate a respective set of edge information that represents a volume swept by at least a portion of the first robot in transitioning between the states represented by the respective nodes that are coupled by the respective edge; store the plurality of planning graphs and the sets of edge information in at least one nontransitory processor-readable storage; based on at least a portion of the first robot having a first set of physical dimensions at a first time, provide the sets of edge information for a first one of the planning graphs to at least one processor; and based on at least a portion of the first robot having a second set of physical dimensions at a second time, at least one dimension in the second set of physical dimensions different than a corresponding one of the dimensions of the first set, provide the sets of edge information for a second one of the planning graphs to the at least one processor.

The at least one of processor-executable instructions or data, when executed by the at least one processor, may further cause the at least one processor to perform any of the methods described above.

A method of operation in a robot control system may be summarized as including: for a first discretized representation of an environment in which at least a first robot will operate, the environment occupied by one or more obstacles, supplying at least a portion of the first discretized representation of the environment to at least one processor; for each edge of a first planning graph of a plurality of planning graphs stored in memory relative to the at least one processor, wherein each planning graph of the plurality of planning graphs is associated with a different set of physical dimensions of the first robot, providing a respective set of edge information to the at least one processor, the respective set of edge information which represents a volume swept by at least a portion of the first robot in transitioning between a pair of states of the first robot, the pair of states of the first robot represented by respective ones of a pair of nodes of the first planning graph, the respective pair of nodes which are coupled by a respective edge of the first planning graph, the respective edge which represents a transition between the respective pair of states of the first robot; and identifying any of the edges of the first planning graph that the corresponding transition would result in a collision between at least a portion of the robot and at least a portion of at least one of the one or more obstacles in the environment.

Providing a respective set of edge information to the at least one processor may include applying the edge information for one of the edges to each of a plurality of circuits of the at least one processor in parallel. Providing a respective set of edge information to the at least one processor may include, for each edge, applying the edge information for the respective edge to each of a plurality of circuits of the at least one processor in parallel. Providing a respective set of edge information to the at least one processor may include, for each edge, applying to circuits of the at least one processor a respective set of edge information that represents in terms of voxels a volume swept by at least a portion of the first robot in transitioning between the states represented by the respective nodes that are coupled by the respective edge. Providing a respective set of edge information to the at least one processor may include, for each edge, applying to circuits of the at least one processor a respective set of edge information that represents in terms of units of volume a volume swept by at least a portion of the first robot in transitioning between the states represented by the respective nodes that are coupled by the respective edge, the units of volume which each cover two or more voxels. Providing a respective set of edge information to the at least one processor t may include, for each edge, applying to circuits of the at least one processor a respective set of edge information that represents, in terms of rectangular prisms, a volume swept by at least a portion of the first robot in transitioning between the states represented by the respective nodes that are coupled by the respective edge, the units of volume which each cover two or more voxels. Applying to the circuits a respective set of edge information that represents, in terms of rectangular prisms, a volume swept by at least a portion of the first robot in transitioning between the states represented by the respective nodes that are coupled by the respective edge may include, for each of the rectangular prisms, storing a pair of three dimensional coordinates that completely define the volume of the respective rectangular prism.

The method of operation in a robot control system may further include: determining that the first robot will or has changed from a first arrangement to a second arrangement, the second arrangement different from the first arrangement; for each edge of a second planning graph of the plurality of planning graphs, providing a respective set of edge information to the at least one processor, the respective set of edge information which represents a volume swept by at least a portion of the first robot in transitioning between a pair of states of the first robot, the pair of states of the first robot represented by respective ones of a pair of nodes of the second planning graph, the respective pair of nodes which are coupled by a respective edge of the second planning graph, the respective edge which represents a transition between the respective pair of states of the first robot, the second planning graph different from the first planning graph; and identifying any of the edges of the second planning graph that the corresponding transition would result in a collision between at least a portion of the robot and at least a portion of at least one of the one or more obstacles in the environment.

The first robot may include a first appendage that is selectively operable for movement with respect to the environment in which the first robot operates, and determining that the first robot will or has changed from a first arrangement to a second arrangement may include determining that a second end effector is attached or being attached to the first appendage in place of a first end effector. The first robot may include a first appendage that is selectively operable for movement with respect to the environment in which the first robot operates, and a first end effector may be attached to the first appendage, the first end effector selectively operable for movement between at least an un-grasped arrangement and a grasped arrangement, at least one of a size or shape of a volume occupied by the first end effector in the grasped arrangement being different from at least one of a size or shape of a volume occupied by the first end effector in the un-grasped arrangement, and determining that the first robot will or has changed from a first arrangement to a second arrangement may include determining that the first end effector attached to the first appendage is changing or has changed a grasp arrangement. Determining that the first end effector attached to the first appendage is changing or has changed a grasp arrangement may include determining that the first end effector is or has transitioned between an un-grasped arrangement and a grasped arrangement. The first robot may be at least one of an autonomous or semi-autonomous vehicle, at least one of a size or shape of a volume occupied by the at least one of an autonomous or semi-autonomous vehicle in a first arrangement is different from at least one of a size or shape of a volume occupied by the at least one of an autonomous or semi-autonomous vehicle in the second arrangement, and wherein determining that the first robot will or has changed from a first arrangement to a second arrangement may include determining that the at least one of an autonomous or semi-autonomous vehicle is transitioning or has transitioned between in the first and the second arrangements of the at least one of an autonomous or semi-autonomous vehicle. The providing a respective set of edge information for each edge of the first planning graph to the at least one processor may include retrieving the respective set of edge information from a nontransitory storage during a run time period, the respective set of edge information which was stored to the nontransitory storage during a pre-run time period. The at least one processor may be at least one of a field programmable gate array or application specific integrated circuit, and providing the respective set of edge information to at least one processor may include applying the edge information for one of the edges to each of a plurality of circuits of the at least one processor implemented in the at least one of a field programmable gate array or application specific integrated circuit.

The method of operation in a robot control system may further include: storing the first discretized representation of the environment in a memory on the at least one processor; and after storing the first discretized representation of the environment in a memory on the at least one processor, receiving the set of edge information by the at least one processor from a storage that is separate from the at least one processor.

A processor-based robot control system may be summarized as including: at least one processor; and at least one nontransitory processor-readable medium that stores at least one of processor-executable instructions or data which, when executed by the at least one processor, causes the at least one processor to: for a first discretized representation of an environment in which at least a first robot will operate, the environment occupied by one or more obstacles, supply at least a portion of the first discretized representation of the environment to at least one processor; for each edge of a first planning graph of a plurality of planning graphs stored in memory relative to the at least one processor, wherein each planning graph of the plurality of planning graphs is associated with a different set of physical dimensions of the first robot, provide a respective set of edge information to the at least one processor, the respective set of edge information which represents a volume swept by at least a portion of the first robot in transitioning between a pair of states of the first robot, the pair of states of the first robot represented by respective ones of a pair of nodes of the first planning graph, the respective pair of nodes which are coupled by a respective edge of the first planning graph, the respective edge which represents a transition between the respective pair of states of the first robot; and identify any of the edges of the first planning graph that the corresponding transition would result in a collision between at least a portion of the robot and at least a portion of at least one of the one or more obstacles in the environment.

The at least one of processor-executable instructions or data, when executed by the at least one processor, may further cause the at least one processor to perform any of the methods described above.

A method of operation in a system to facilitate motion planning may be summarized as including: for at least a first scenario that includes a set of a plurality of pairs of tasks and environments, for each of the pairs of tasks and environments of the at least the first scenario, for each of a plurality of iterations, generating a respective discretization of a representation of an environment in which a robot will operate by at least one processor, at least two of the respective discretizations comprising a respective set of voxels, where the voxels of the at least two of the respective discretizations are non-homogenous in at least one of size and shape within the respective discretization, and a respective distribution of the non-homogeneousness of the voxels of the at least two of the respective discretizations is different from one another; assessing an effectiveness of the generated respective discretizations of the representation of the environment in which the robot will operate; and storing to at least one nontransitory processor-readable media at least the generated respective discretizations of the representation of the environment in which the robot will operate that is assessed to be the most effective for at least the first scenario.

Generating a respective discretization of a representation of an environment in which a robot will operate by at least one processor may include generating a first respective discretization in which each of a plurality of the voxels of at least one region in a front of the robot has a relatively small volume as compared to a respective volume of each of a plurality of the voxels in at least one region behind the robot. Generating a respective discretization of a representation of an environment in which a robot will operate by at least one processor may include generating a first respective discretization in which each of a plurality of the voxels of a first region in a front of the robot has a first volume, a plurality of the voxels of a second region in a front of the robot has a second volume, the second volume different than the first volume. Generating a respective discretization of a representation of an environment in which a robot will operate by at least one processor may include generating a first respective discretization in which each of a plurality of the voxels of a first region in a front of the robot has a first volume, a plurality of the voxels of a second region in the front of the robot has a second volume, and a plurality of the voxels of a third region in the front of the robot has a third volume, the third volume different than the second volume. Generating a respective discretization of a representation of an environment in which a robot will operate by at least one processor may include generating a first respective discretization in which each of a plurality of the voxels of a first region in a front of the robot has a first volume, a plurality of the voxels of a second region in the front of the robot has a second volume, and a plurality of the voxels of a third region in the front of the robot has a third volume, the second volume different than the first volume, and the third volume different than the second volume. Generating a respective discretization of a representation of an environment in which a robot will operate by at least one processor may include generating a first respective discretization in which each of a plurality of the voxels in a first region immediately in a front of the robot has a first volume, a plurality of the voxels in a second region in the front of the robot and spaced relatively outward from the first region with respect to the robot has a second volume, and a plurality of the voxels in a third region in the front of the robot and spaced relatively outward from the second region with respect to the robot has a third volume, the second volume different than the first volume, and the third volume different than the second volume. Generating a respective discretization of a representation of an environment in which a robot will operate by at least one processor may include generating a first respective discretization in which a shape of each of a plurality of the voxels in at least one region in a front of the robot is different than a shape of each of a plurality of the voxels of at least one region behind the robot. Generating a respective discretization of a representation of an environment in which a robot will operate by at least one processor may include generating a first respective discretization in which each of a plurality of the voxels a first region in a front of the robot has a first shape, a plurality of the voxels a second region in a front of the robot has a second shape, the second shape different then the first shape. Generating a respective discretization of a representation of an environment in which a robot will operate by at least one processor may include generating a first respective discretization in which each of a plurality of the voxels in a first region in a front of the robot has a first shape, a plurality of the voxels a second region in the front of the robot has a second shape, and a plurality of the voxels in a third region in the front of the robot has a third shape, the third shape different than the second shape. Generating a respective discretization of a representation of an environment in which a robot will operate by at least one processor may include generating a first respective discretization in which each of a plurality of the voxels in a first region in a front of the robot has a first shape, a plurality of the voxels a second region in the front of the robot has a second shape, and a plurality of the voxels in a third region in the front of the robot has a third shape, the second shape different than the first shape, and the third shape different than the second shape. Generating a respective discretization of a representation of an environment in which a robot will operate by at least one processor may include generating a first respective discretization in which each of a plurality of the voxels in a first region immediately in a front of the robot has a first shape, a plurality of the voxels in a second region in the front of the robot and spaced relatively outward from the first region with respect to the robot has a second shape, and a plurality of the voxels in a third region in the front of the robot and spaced relatively outward from the second region with respect to the robot has a third shape, the second shape different than the first shape, and the third shape different than the second shape. Generating a respective discretization of a representation of an environment in which a robot will operate by at least one processor may include generating a first respective discretization in which both a shape and a volume of each of a plurality of the voxels in at least one region in a front of the robot is different than both a shape and a volume of each of a plurality of the voxels of at least one region behind the robot. Generating a respective discretization of a representation of an environment in which a robot will operate by at least one processor may include generating a first respective discretization in which both a shape and a volume of each of a plurality of the voxels in at least one region in a front of the robot is different than both a shape and a volume of each of a plurality of the voxels of at least one region behind the robot, and at least one of the shapes is non-cubic. Assessing an effectiveness of the generated respective discretizations of the representation of the environment in which the robot will operate may include determining which of generated respective discretizations of the representation of the environment in which the robot will operate is mostly likely to result in a path without collisions. Assessing an effectiveness of the generated respective discretizations of the representation of the environment in which the robot will operate may include determining which of generated respective discretizations of the representation of the environment in which the robot will operate is mostly likely to result in a path with a lowest probability of a collision. Assessing an effectiveness of the generated respective discretizations of the representation of the environment in which the robot will operate may include determining which of generated respective discretizations of the representation of the environment in which the robot will operate is mostly likely to result in a lowest cost collision free path. Storing to at least one nontransitory processor-readable media at least the generated respective discretizations of the representation of the environment in which the robot will operate that are assessed to be the most effective for at least the first scenario may include storing at least one generated respective discretization for each of a plurality of scenarios, along with an indication of which of the generated respective discretizations should be used for each of the plurality of scenarios.

A processor-based system to facilitate motion planning may be summarized as including: at least one processor; and at least one nontransitory processor-readable medium that stores at least one of processor-executable instructions or data which, when executed by the at least one processor, causes the at least one processor to: for at least a first scenario that includes a set of a plurality of pairs of tasks and environments, for each of the pairs of tasks and environments of the at least the first scenario, for each of a plurality of iterations, generate a respective discretization of a representation of an environment in which a robot will operate by at least one processor, at least two of the respective discretizations comprising a respective set of voxels, where the voxels of the at least two of the respective discretizations are non-homogenous in at least one of size and shape within the respective discretization, and a respective distribution of the non-homogeneousness of the voxels of the at least two of the respective discretizations is different from one another; assess an effectiveness of the generated respective discretizations of the representation of the environment in which the robot will operate; and store to at least one nontransitory processor-readable media at least the generated respective discretizations of the representation of the environment in which the robot will operate that is assessed to be the most effective for at least the first scenario.

The at least one of processor-executable instructions or data, when executed by the at least one processor, may further cause the at least one processor to perform any of the methods described above.

A method of operation in a system to facilitate motion planning may be summarized as including: based at least in part on an identified scenario that classifies a pair of a task which a robot will perform and an environment in which the robot will operate, determining which of a number of discretizations to use to generate a number of swept volumes that represent respective regions through which at least a portion of the robot will pass when transitioning between one state of the robot and another state of the robot; for each of a plurality of edges in a planning graph, determining a respective swept volume of the edge using the determined discretization, the planning graph comprising a plurality of nodes and a plurality of edges, each node which represents a respective one of a plurality of states of the robot, each of the edges coupling a respective pair of the nodes and representing a respective transition by the robot between the states represented by the respective nodes coupled by the respective edge; and storing to at least one nontransitory processor-readable media at least one of the determined swept volume's respective discretizations of the representation of the environment in which the robot will operate that is assessed to be the most effective for at least the identified scenario.

Determining which of a number of discretizations to use to generate a number of swept volumes may include selecting between at least two discretizations based on the identified scenario, where the voxels of the at least two of the respective discretizations may be non-homogenous in at least one of size and shape within the respective discretization, and a respective distribution of the non-homogeneousness of the voxels of the at least two of the respective discretizations may be different from one another. Determining a respective swept volume of the edge using the determined discretization may include determining the respective swept volume of the edge using the determined discretization in which each of a plurality of the voxels of at least one region in a front of the robot may have a relatively small volume as compared to a respective volume of each of a plurality of the voxels in at least one region behind the robot. Determining a respective swept volume of the edge using the determined discretization may include determining the respective swept volume of the edge using the determined discretization in which each of a plurality of the voxels in a first region in a front of the robot may have a first volume, a plurality of the voxels in a second region in a front of the robot may have a second volume, the second volume different then the first volume. Determining a respective swept volume of the edge using the determined discretization may include determining the respective swept volume of the edge using the determined discretization in which each of a plurality of the voxels in a first region in a front of the robot may have a first volume, a plurality of the voxels in a second region in the front of the robot may have a second volume, and a plurality of the voxels in a third region in the front of the robot may have a third volume, the third volume different than the second volume. Determining a respective swept volume of the edge using the determined discretization may include determining the respective swept volume of the edge using the determined discretization in which each of a plurality of the voxels in a first region in a front of the robot may have a first volume, a plurality of the voxels in a second region in the front of the robot may have a second volume, and a plurality of the voxels in a third region in the front of the robot may have a third volume, the second volume different than the first volume, and the third volume different than the second volume. Determining a respective swept volume of the edge using the determined discretization may include determining the respective swept volume of the edge using the determined discretization in which each of a plurality of the voxels in a first region immediately in a front of the robot may have a first volume, a plurality of the voxels in a second region in the front of the robot and spaced relatively outward from the first region with respect to the robot may have a second volume, and a plurality of the voxels in a third region in the front of the robot and spaced relatively outward from the second region with respect to the robot may have a third volume, the second volume different than the first volume, and the third volume different than the second volume. Determining a respective swept volume of the edge using the determined discretization may include determining the respective swept volume of the edge using the determined discretization in which a shape of each of a plurality of the voxels in at least one region in a front of the robot may be different than a shape of each of a plurality of the voxels of at least one region behind the robot. Determining a respective swept volume of the edge using the determined discretization may include determining the respective swept volume of the edge using the determined discretization in which each of a plurality of the voxels in a first region in a front of the robot may have a first shape, and a plurality of the voxels in a second region in a front of the robot may a second shape, the second shape different then the first shape. Determining a respective swept volume of the edge using the determined discretization may include determining the respective swept volume of the edge using the determined discretization in which each of a plurality of the voxels in a first region in a front of the robot may have a first shape, a plurality of the voxels in a second region in the front of the robot may have a second shape, and a plurality of the voxels in a third region in the front of the robot may have a third shape, the third shape different than the second shape. Determining a respective swept volume of the edge using the determined discretization may include determining the respective swept volume of the edge using the determined discretization in which each of a plurality of the voxels in a first region in a front of the robot may have a first shape, a plurality of the voxels in a second region in the front of the robot may have a second shape, and a plurality of the voxels in a third region in the front of the robot may have a third shape, the second shape different than the first shape, and the third shape different than the second shape. Determining a respective swept volume of the edge using the determined discretization may include determining the respective swept volume of the edge using the determined discretization in which each of a plurality of the voxels in a first region immediately in a front of the robot may have a first shape, a plurality of the voxels in a second region in the front of the robot and spaced relatively outward from the first region with respect to the robot may have a second shape, and a plurality of the voxels in a third region in the front of the robot and spaced relatively outward from the second region with respect to the robot may have a third shape, the second shape different than the first shape, and the third shape different than the second shape. Determining a respective swept volume of the edge using the determined discretization may include determining the respective swept volume of the edge using the determined discretization in which both a shape and a volume of each of a plurality of the voxels in at least one region in a front of the robot is different than both a shape and a volume of each of a plurality of the voxels of at least one region behind the robot.

The method of operation in a system to facilitate motion planning may further include receiving the identified scenario.

The method of operation in a system to facilitate motion planning may further include providing a respective set of edge information to at least one processor, the respective set of edge information which represents the respective swept volume swept by at least a portion of the first robot in transitioning between a pair of states of the robot.

The at least one processor may be at least one of a field programmable gate array or application specific integrated circuit, and may further include applying a respective set of edge information to each of a plurality of circuits of the at least one processor implemented in the at least one of a field programmable gate array or application specific integrated circuit, the respective set of edge information which represents the respective swept volume swept by at least a portion of the robot in transitioning between a pair of states of the robot.

A processor-based system to facilitate motion planning may be summarized as including: at least one processor; and at least one nontransitory processor-readable medium that stores at least one of processor-executable instructions or data which, when executed by the at least one processor, causes the at least one processor to: based at least in part on an identified scenario that classifies a pair of a task which a robot will perform and an environment in which the robot will operate, determine which of a number of discretizations to use to generate a number of swept volumes that represent respective regions through which at least a portion of the robot will pass when transitioning between one state of the robot and another state of the robot; for each of a plurality of edges in a planning graph, determine a respective swept volume of the edge using the determined discretization, the planning graph comprising a plurality of nodes and a plurality of edges, each node which represents a respective one of a plurality of states of the robot, each of the edges coupling a respective pair of the nodes and representing a respective transition by the robot between the states represented by the respective nodes coupled by the respective edge; and store to at least one nontransitory processor-readable media at least one of the determined swept volume's respective discretizations of the representation of the environment in which the robot will operate that is assessed to be the most effective for at least the identified scenario.

The at least one of processor-executable instructions or data, when executed by the at least one processor, may further cause the at least one processor to perform any of the methods described above.

A method of operation in a system to facilitate motion planning may be summarized as including: based at least in part on an identified scenario that classifies a pair of a task which a robot will perform and an environment in which the robot operates, determining which of a number of discretizations to use to generate a discretized representation of the environment, including obstacles, if any, in the environment; receiving sensor information produced by one or more sensors that sense the environment, the sensor information which represents the environment, including obstacles, if any, in the environment; and generating a discretized representation of the environment, including obstacles, if any, in the environment using the determined discretization, wherein a plurality of voxels of the determined discretization are non-homogenous in at least one of size and shape within the respective discretization, and a respective distribution of the non-homogeneousness of the voxels of the determined discretization is different from that of another one of the number of discretizations.

The method of operation in a system to facilitate motion planning may further include storing to at least one nontransitory processor-readable media the determined generated discretized representation of the environment, including obstacles, if any, in the environment.

Generating a discretized representation of the environment, including obstacles, if any, in the environment may include generating the discretized representation of the environment using a distribution of voxel size and shape that matches a distribution of voxel size and shape used to generate a discretized representation of a swept volume. Generating a discretized representation of the environment, including obstacles, if any, in the environment may include generating the discretized representation of the environment using a distribution of voxel size and shape that matches a distribution of voxel size and shape used to generate a discretized representation of a swept volume swept by at least a portion of a robot. Determining which of a number of discretizations to use to generate a discretized representation of the environment, including obstacles, if any, in the environment, may include selecting between at least two discretizations based on the identified scenario, where the voxels of the at least two of the respective discretizations may be non-homogenous in at least one of size and shape within the respective discretization, and a respective distribution of the non-homogeneousness of the voxels of the at least two of the respective discretizations may be different from one another. Generating a discretized representation of the environment, including obstacles, if any, in the environment may include generating the discretized representation of the environment using the determined discretization in which each of a plurality of the voxels of at least one region in a front of the robot may have a relatively small volume as compared to a respective volume of each of a plurality of the voxels in at least one region behind the robot. Generating a discretized representation of the environment, including obstacles, if any, in the environment may include generating the discretized representation of the environment using the determined discretization in which each of a plurality of the voxels in a first region in a front of the robot may have a first volume, and a plurality of the voxels in a second region in a front of the robot may a second volume, the second volume different then the first volume. Generating a discretized representation of the environment, including obstacles, if any, in the environment may include generating the discretized representation of the environment using the determined discretization in which each of a plurality of the voxels in a first region in a front of the robot may have a first volume, a plurality of the voxels in a second region in the front of the robot may have a second volume, and a plurality of the voxels in a third region in the front of the robot may have a third volume, the third volume different than the second volume. Generating a discretized representation of the environment, including obstacles, if any, in the environment may include generating the discretized representation of the environment using the determined discretization in which each of a plurality of the voxels in a first region in a front of the robot may have a first volume, a plurality of the voxels in a second region in the front of the robot may have a second volume, and a plurality of the voxels in a third region in the front of the robot may have a third volume, the second volume different than the first volume, and the third volume different than the second volume. Generating a discretized representation of the environment, including obstacles, if any, in the environment may include generating the discretized representation of the environment using the determined discretization in which each of a plurality of the voxels in a first region immediately in a front of the robot may have a first volume, a plurality of the voxels in a second region in the front of the robot and spaced relatively outward from the first region with respect to the robot may have a second volume, and a plurality of the voxels in a third region in the front of the robot and spaced relatively outward from the second region with respect to the robot may have a third volume, the second volume different than the first volume, and the third volume different than the second volume. Generating a discretized representation of the environment, including obstacles, if any, in the environment may include generating the discretized representation of the environment using the determined discretization in which a shape of each of a plurality of the voxels in at least one region in a front of the robot may be different than a shape of each of a plurality of the voxels of at least one region behind the robot. Generating a discretized representation of the environment, including obstacles, if any, in the environment may include generating the discretized representation of the environment using the determined discretization in which each of a plurality of the voxels in a first region in a front of the robot may have a first shape, and a plurality of the voxels in a second region in a front of the robot may have a second shape, the second shape different then the first shape. Generating a discretized representation of the environment, including obstacles, if any, in the environment may include generating the discretized representation of the environment using the determined discretization in which each of a plurality of the voxels in a first region in a front of the robot may have a first shape, a plurality of the voxels in a second region in the front of the robot may have a second shape, and a plurality of the voxels in a third region in the front of the robot may have a third shape, the third shape different than the second shape. Generating a discretized representation of the environment, including obstacles, if any, in the environment may include generating the discretized representation of the environment using the determined discretization in which each of a plurality of the voxels in a first region in a front of the robot may have a first shape, a plurality of the voxels in a second region in the front of the robot may have a second shape, and a plurality of the voxels in a third region in the front of the robot may have a third shape, the second shape different than the first shape, and the third shape different than the second shape. Generating a discretized representation of the environment, including obstacles, if any, in the environment may include generating the discretized representation of the environment using the determined discretization in which each of a plurality of the voxels in a first region immediately in a front of the robot may have a first shape, a plurality of the voxels in a second region in the front of the robot and spaced relatively outward from the first region with respect to the robot may have a second shape, and a plurality of the voxels in a third region in the front of the robot and spaced relatively outward from the second region with respect to the robot may have a third shape, the second shape different than the first shape, and the third shape different than the second shape. Generating a discretized representation of the environment, including obstacles, if any, in the environment may include generating the discretized representation of the environment using the determined discretization in which both a shape and a volume of each of a plurality of the voxels in at least one region in a front of the robot may be different than both a shape and a volume of each of a plurality of the voxels of at least one region behind the robot.

The method of operation in a system to facilitate motion planning may further include: receiving information that represents the task to be performed by the robot and the environment in which the robot is to operate; identifying the identified scenario based at least in part on received information.

The method of operation in a system to facilitate motion planning may further include providing the discretized representation of the environment to at least one processor.

The at least one processor may be at least one of a field programmable gate array or application specific integrated circuit, and may further include applying the discretized representation of the environment to each of a plurality of circuits implemented in the at least one of a field programmable gate array or application specific integrated circuit.

A processor-based system to facilitate motion planning may be summarized as including: at least one processor; and at least one nontransitory processor-readable medium that stores at least one of processor-executable instructions or data which, when executed by the at least one processor, causes the at least one processor to: based at least in part on an identified scenario that classifies a pair of a task which a robot will perform and an environment in which the robot operates, determine which of a number of discretizations to use to generate a discretized representation of the environment, including obstacles, if any, in the environment; receive sensor information produced by one or more sensors that sense the environment, the sensor information which represents the environment, including obstacles, if any, in the environment; and generate a discretized representation of the environment, including obstacles, if any, in the environment using the determined discretization, wherein a plurality of voxels of the determined discretization are non-homogenous in at least one of size and shape within the respective discretization, and a respective distribution of the non-homogeneousness of the voxels of the determined discretization is different from that of another one of the number of discretizations.

The at least one of processor-executable instructions or data, when executed by the at least one processor, may further cause the at least one processor to perform any of the methods described above.

A method of operation in a robot control system that employs a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states is represented by a respective ones of a pair of nodes that are coupled by a respective edge in the respective planning graph may be summarized as including: for a first planning graph of the plurality of planning graphs, for each of a plurality of edges of the first planning graph performing collision checking for collisions between a discretized representation of a swept volume associated with the edge and a discretized representation of any obstacles in an environment in which the robot will operate; updating the first planning graph based on the collision checking; performing an optimization of the updated first planning graph to identify one or more optimized results, if any, from the updated first planning graph; determining whether the one or more optimized results, if any, from the updated first planning graph meets a satisfaction condition; in response to determining that the optimized result does not meet the satisfaction condition: for each of a plurality of edges of the second planning graph performing collision checking for collisions between a discretized representation of a swept volume associated with the edge and a discretized representation of any obstacles in an environment in which the robot will operate, updating the second planning graph based on the collision checking; and performing an optimization of the updated second planning graph to identify one or more optimized results, if any, from the updated second planning graph.

The method of operation in a robot control system that employs a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states is represented by a respective ones of a pair of nodes that are coupled by a respective edge in the respective planning graph may further include determining whether the one or more optimized results, if any, from the updated second planning graph, if any, meets a satisfaction condition.

The method of operation in a robot control system that employs a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states is represented by a respective ones of a pair of nodes that are coupled by a respective edge in the respective planning graph may, in response to determining that the one or more optimized results, if any, from the updated second planning graph meets the satisfaction condition, apply a transition identified by one of the one or more optimized results from the updated second planning graph to the robot.

The method of operation in a robot control system that employs a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states is represented by a respective ones of a pair of nodes that are coupled by a respective edge in the respective planning graph may, in response to determining that the one or more optimized results, if any, from the updated second planning graph does not meet the satisfaction condition: for each of a plurality of edges of a third planning graph performing collision checking for collisions between a discretized representation of a swept volume associated with the edge and a discretized representation of any obstacles in an environment in which the robot will operate, update the third planning graph based on the collision checking; and perform an optimization of the updated third planning graph to identify one or more optimized results, if any, from the updated third planning graph.

The method of operation in a robot control system that employs a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states is represented by a respective ones of a pair of nodes that are coupled by a respective edge in the respective planning graph may, in response to determining that the one or more optimized results, if any, from the updated third planning graph meets the satisfaction condition: apply a transition identified by one of the one or more optimized results from the updated third planning graph to the robot.

Determining that the one or more optimized results, if any, from the updated second planning graph meets the satisfaction condition may include determining whether the optimization produces any paths. Determining that the one or more optimized results, if any, from the updated second planning graph meets the satisfaction condition may include determining whether the optimization produces any collision-free paths. Performing collision checking for collisions between a discretized representation of a swept volume associated with the edge and a discretized representation of any obstacles in an environment in which the robot will operate may include, for each of the edges in the first planning graph, applying a set of edge information for the edges to each of a plurality of circuits in parallel, the circuits which each represent a respective unit volume occupied by an obstacle in the environment in which the robot operates.

The method of operation in a robot control system that employs a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states is represented by a respective ones of a pair of nodes that are coupled by a respective edge in the respective planning graph may further include configuring at least one processor to implement a plurality of circuits that represent respective ones of each of a plurality of unit volumes occupied by one or more obstacles in the environment in which at least the first robot will operate.

A processor-based robot control system that employs a plurality of planning graphs, each planning graph respectively comprising a plurality of nodes connected by a plurality of edges, each node which represents, implicitly or explicitly, variables that characterize a respective state of the first robot, and each edge which represents a transition between a respective pair of the states of the first robot, where the respective pair of states is represented by a respective ones of a pair of nodes that are coupled by a respective edge in the respective planning graph, may be summarized as including: at least one processor; and at least one nontransitory processor-readable medium that stores at least one of processor-executable instructions or data which, when executed by the at least one processor, causes the at least one processor to: for a first planning graph of the plurality of planning graphs, for each of a plurality of edges of the first planning graph perform collision checking for collisions between a discretized representation of a swept volume associated with the edge and a discretized representation of any obstacles in an environment in which the robot will operate; update the first planning graph based on the collision checking; perform an optimization of the updated first planning graph to identify one or more optimized results, if any, from the updated first planning graph; determine whether the one or more optimized results, if any, from the updated first planning graph meets a satisfaction condition; in response to determining that the optimized result does not meet the satisfaction condition: for each of a plurality of edges of the second planning graph perform collision checking for collisions between a discretized representation of a swept volume associated with the edge and a discretized representation of any obstacles in an environment in which the robot will operate, update the second planning graph based on the collision checking; and perform an optimization of the updated second planning graph to identify one or more optimized results, if any, from the updated second planning graph.

The at least one of processor-executable instructions or data, when executed by the at least one processor, may further cause the at least one processor to perform any of the methods described above.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
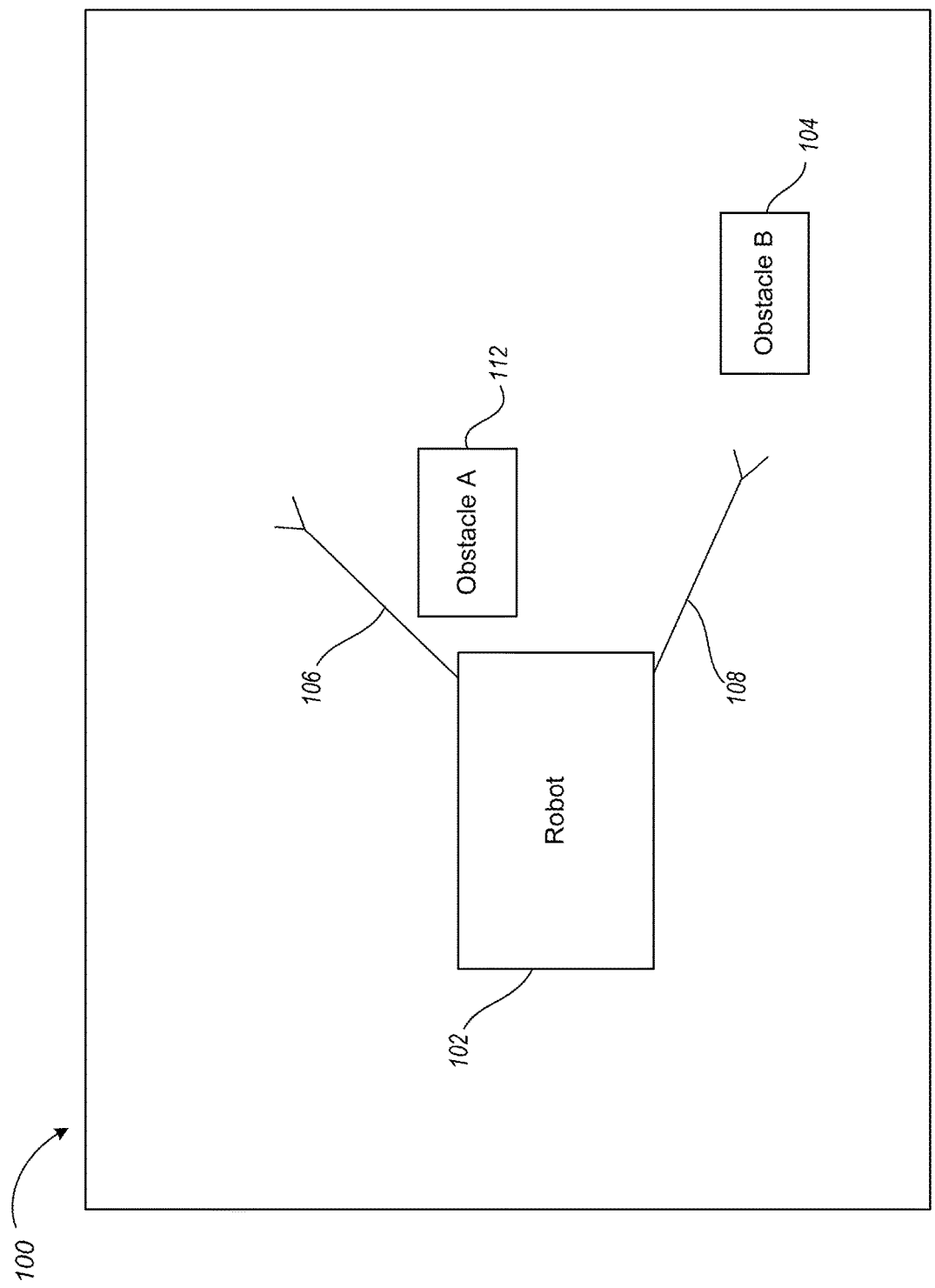
FIG. 1 is a schematic view of an environment in which a robot may operate, according to one illustrated embodiment.

FIG. 1 shows an operational environment 100 in which a robot 102 may operate, according to one illustrated embodiment. For the sake of brevity, the operational environment 100 is referred to herein as the environment 100. The environment represents a two-dimensional or three-dimensional space in which the robot 102 may operate and move. The robot 102 may be any type of robot, including, but not limited to: Cartesian, selectively compliant arm for robotic assembly (SCARA), cylindrical, delta, polar and vertically articulated. The robot may also be an automobile, airplane, drone, or any other vehicle that can operate autonomously or semi-autonomously (i.e., at least partially autonomously) and move in the space represented by the environment 100. The environment 100 is the two- or three-dimensional space in which the robot operates and is different than the robot's "configuration space" (often called "C-space") referenced below with respect to the motion planning graphs of FIGS. 4A and 4B and as explained in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," which is hereby incorporated by reference in its entirety; and in International Patent Application Publication No. WO 2016/122840, filed Jan. 5, 2016, entitled "SPECIALIZED ROBOT MOTION PLANNING HARDWARE AND METHODS OF MAKING AND USING SAME," which is also hereby incorporated by reference in its entirety. The configuration space is typically many dimensional (i.e., greater than 3 dimensions). In particular, each node of the planning graph represents a state of the robot which may include, but is not limited to, a particular configuration of the robot (which is the complete specification of a particular set of joint positions of the robot), pose, velocity and heading of the robot. Each edge of the planning graph represents a transition of the robot from one state to another state.

Referring to FIG. 1, the environment 100 can include obstacle collision regions. These obstacle collision regions may be due to static objects (e.g., buildings, trees, rocks, furniture, etc.) or dynamic objects (e.g., other robots, vehicles, people, animals, rolling rocks, birds, etc.) in the environment 100. For example, obstacle A 112 and obstacle B 104 represent objects that create collision regions in the environment 100 such that it is possible for robot 102 to collide with obstacle A 112 or obstacle B 104 if robot 102 attempts to occupy the same space within the environment 100 at the same time as either obstacle A 112 or obstacle B 104. In various embodiments, there may be fewer or additional objects than that shown in FIG. 1.

Challenges to motion planning involve the ability to perform motion planning at a relatively low cost, but at very fast speeds and frequently as characteristics of the robot itself change. For example, such characteristics may include, but are not limited to, the volume considered occupied by the robot when the robot is holding objects of various sizes, when changing to a different end effector or when changing to a different appendage. Thus, it is advantageous for the robot 102 to keep up with those changes in order to perform motion. Involved with this are challenges to efficiently represent, communicate and compare the space considered to be occupied by the robot 102 and the obstacles in the environment 100. For example, as shown in FIG. 1, obstacle A 112 is currently in front of robot 102. It is advantageous for robot 102 to be able to quickly and efficiently determine which movements of robot arm 106 (and any movement of robot 102) would result in a collision with obstacle A 112. Therefore, the present disclosure provides solutions that would enable robot 102 to efficiently represent, communicate and compare the space occupied by robot 102 and obstacle A 112 in the environment 100 to facilitate determining which movements of robot arm 106 would result in a collision with obstacle A 112.

While FIG. 1 illustrates a representative environment 100, typical environments may include many additional objects and entities, including objects that correspond to other robots and various other natural or artificial static and dynamic objects and obstacles. The concepts taught herein may be employed in a similar fashion with a more populated environment than that illustrated.

Figure 2:
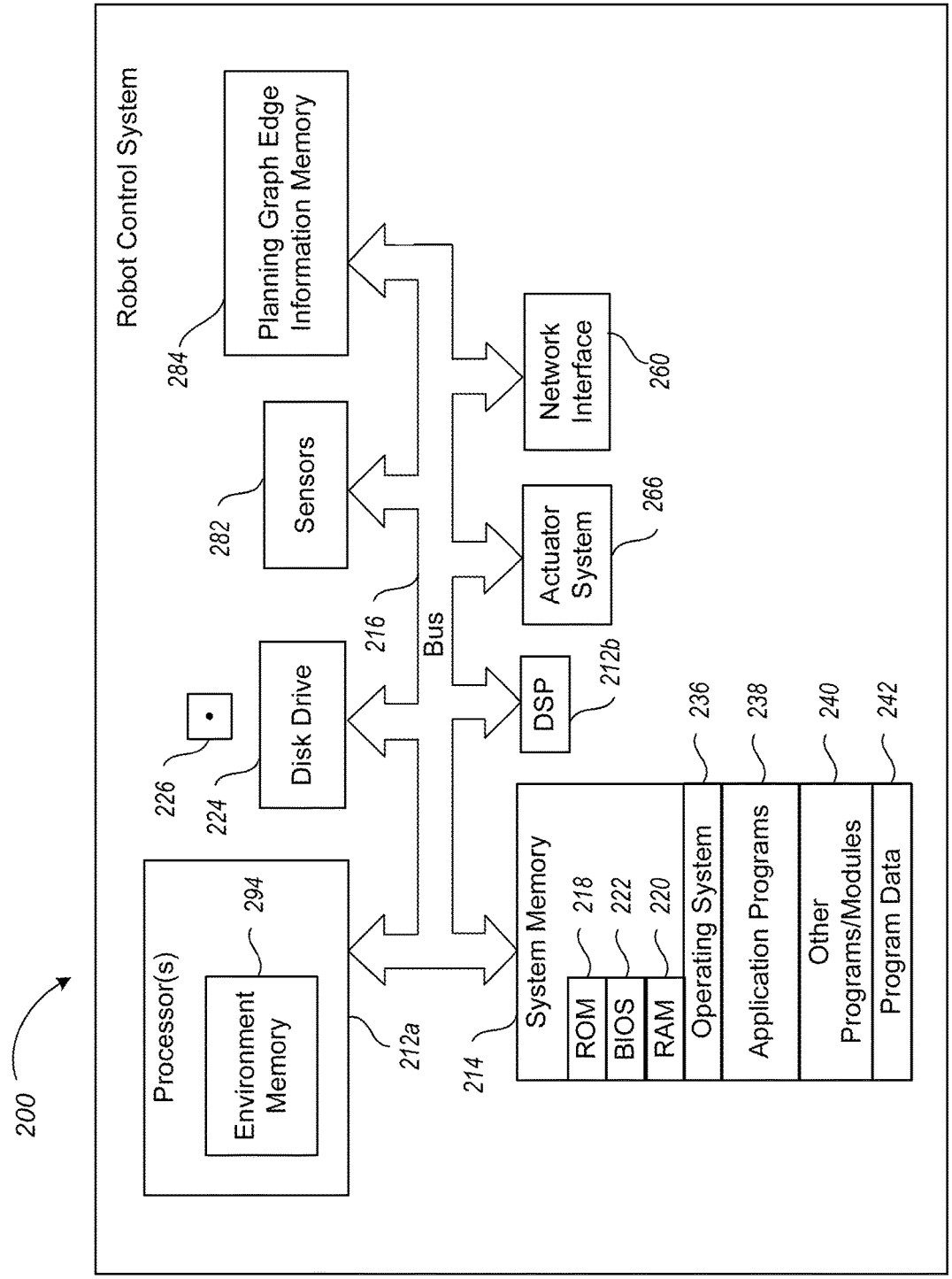
FIG. 2 is a functional block diagram of a robot control system of a robot that may operate in the environment of FIG. 1, according to one illustrated embodiment.

FIG. 2 and the following discussion provide a brief, general description of a suitable robot control system 200 in which various illustrated and described motion planning systems and methods might be implemented, according to one illustrated embodiment.

Although not required, many of the embodiments will be described in the general context of computer-executable instructions, such as program application modules, objects, or macros stored on computer- or processor-readable media and executed by one or more computer or processors that can perform collision assessments and motion planning operations. Such motion planning operations may include, but are not limited to, one or more of: generating one or more discretized representations of robot swept volumes associated with edges of planning graphs; determining which of a number of discretizations to use to generate discretized representations of robot sweep volumes; generating discretized representations of the environment in which the robot 102 will operate, including obstacles in the environment; determining which of a number of discretizations to use to generate a discretized representation of the environment; determining a plurality of planning graphs; storing the determined plurality of planning graphs and respective sets of edge information; generating information that represents a volume swept by at least a portion of the robot 102 in transitioning between the states represented by the nodes of the planning graphs; performing a collision assessment on edges of a planning graph; providing sets of edge information for the planning graphs; identifying one or more optimized results from planning graphs; collision checking for collisions between discretized representations of swept volumes associated with edges of planning graphs and discretized representations of obstacles in the environment in which the robot 102 will operate; determining whether the optimization produces any collision-free paths for the robot 102; and implementing a motion plan for the robot 102.

The robot 102 of FIG. 1 has sensors, such as sensors 282 shown in FIG. 2, which send perception data to one or more processors, such as processor 212a. The perception data is a stream of which voxels or boxes are present in the current environment. This data is generated by (or provided to) one or more processors, such a processor 212a, in the form of an occupancy grid. In particular, when representing either a robot or an object in the environment 100 (e.g., an obstacle), one may represent their surfaces as either voxels (3D pixels) or meshes of polygons (often triangles). Each discretized region of space is termed a "voxel," equivalent to a 3D (volumetric) pixel. In some cases, it is advantageous to represent the objects instead as boxes (rectangular prisms). Due to the fact that objects are not randomly shaped, there may be a significant amount of structure in how the voxels are organized; many voxels in an object are immediately next to each other in 3D space. Thus, representing objects as boxes may require far fewer bits (i.e., may require just the x, y, z Cartesian coordinates for two opposite corners of the box). Also, doing intersection tests for boxes is comparable in complexity to doing so for voxels.

Many embodiments may combine the outputs of multiple sensors and the sensors may provide a very fine granularity voxelization. However, in order for the robot 102 to efficiently perform motion planning, the processor 212a of the robot 102 may use coarser voxels (i.e., "processor voxels") to represent the environment and the volume in 3D space swept by the robot 102 when making transitions between various states. Thus, the system 200 may transform the output of the sensors 282 accordingly. For example, the output of the sensors 282 may use 10 bits of precision on each axis, so each voxel originating directly from the sensors 282 (i.e., a "sensor voxel") has a 30-bit ID, and there are $2^{30}$ sensor voxels. The system 200 uses (at design time and runtime) 6 bits of precision on each axis for an 18-bit processor voxel ID, and there are $2^{18}$ processor voxels. Thus there are $2^{12}$ sensor voxels per processor voxel. At runtime, if the system 200 determines any of the sensor voxels within a processor voxel is occupied, the system 200 considers the processor voxel to be occupied and generates the occupancy grid accordingly.

Each edge of a planning graph for the robot 102 also has some number of voxels (or boxes) corresponding to the volume in 3D space swept by the robot 102 when making the transition in the planning graph from one state to another state represented by that edge. Those voxels or boxes swept by the robot 102 when making the transition in the planning graph from one state to another state represented by that edge may be stored for each edge of the planning graph in off-chip memory devoted to the planning graph, such as in planning graph edge information memory 284. In various other embodiments, the voxels or boxes swept by the robot 102 when making the transition in the planning graph from one state to another state represented by that edge may be stored for each edge of the planning graph in other locations, such as in on-chip memory in one or more application specific integrated circuits (ASIC), for example.

In one embodiment, the collision assessment is performed by first streaming in all of the obstacle voxels (or boxes) onto a processor, such as processor 212a. For example, the obstacle voxels (or boxes) representing environment 100, including obstacle A 112 and obstacle B 104, may be streamed into processor 212a and stored on environment memory 294. The environment memory 294 is on-chip memory of processor 212a. In some embodiments, the environment memory 294 may be block RAM (BRAM) in a field programmable gate array (FPGA). In some embodiments, the BRAM may be a dedicated, configurable two-port memory unit containing several kilobits of random access memory (RAM). The FPGA contains several of these blocks. Then the edge information for each edge of the planning graph for the robot 102 is streamed from the off-chip memory devoted to the planning graph, such as from planning graph edge information memory 284. For each edge voxel (or box), when it is streamed in from the swept volume of an edge, if it collides with any of the obstacle voxels (or boxes), the processor 212a determines a collision with that edge in the planning graph.

For example, when an edge voxel is streamed in from the swept volume of edge x of the planning graph, the processor 212a may use Boolean circuitry to compare the edge voxel with all of the obstacle voxels (or boxes) stored on environment memory 294. If the system 200 determines the edge voxel collides with any of the obstacle voxels (or boxes) based on the comparison, the system 200 notes a collision with edge x. This embodiment improves on the technology of collision assessment because it enables much larger planning graphs to be used in the collision assessment as compared to other designs in which the collision assessment is performed in parallel on all the edges of the planning graph. In particular, this helps overcome the disadvantage of other designs with respect to a limited amount of planning graph information that could be stored on processor chip circuitry. Using the collision assessment method described herein, on-chip storage, such as environment memory 294, is often more than sufficient for storing all the obstacle boxes (although it may be less so with using voxels). This provides the ability to store large planning graphs and/or multiple planning graphs in less expensive, off-chip storage. For example, this provides the ability to store large planning graphs and/or multiple planning graphs in planning graph edge information memory 284 which, in some embodiments, is a less expensive type of memory, such as dynamic random access memory (DRAM).

In various embodiments, such operations may be performed entirely in hardware circuitry or as software stored in a memory storage, such as system memory 214, and executed by one or more hardware processors 212*a*, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EE-PROMs), or as a combination of hardware circuitry and software stored in the memory storage.

Also, implementation of various relevant aspects of perception, planning graph construction, collision detection, and path search are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME" and U.S. Patent Application No. 62/616, 783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS" and are incorporated herein by reference, in their entirety. Those skilled in the relevant art will appreciate that the illustrated embodiments, as well as other embodiments, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The embodiments or portions thereof (e.g., at design time and pre-runtime) can be practiced in distributed computing environments where tasks or modules are performed by remote processing devices, which are linked through a communications network. In a distributed computing environment, program modules may be located in both local and remote memory storage devices or media. However, where and how certain types of information are stored is important to help improve motion planning.

For example, various motion planning solutions "bake in" a roadmap (i.e., a planning graph) into the processor, and each edge in the roadmap corresponds to a non-reconfigurable Boolean circuit of the processor. The design in which the planning graph is "baked in" to the processor, poses a problem of having limited processor circuitry to store multiple or large planning graphs.

One solution provides a reconfigurable design that places the planning graph information into memory storage. With such a solution, once again there is information for each edge of the planning graph, but this information is stored in memory instead of being baked into a circuit. Each edge corresponds to a motion of the robot 102, and each motion sweeps a volume in 3D space. This swept volume collides with some number of obstacle voxels (or boxes, or however it may be decided to represent obstacles in various embodiments). With such a solution, the voxels that this edge collides with is the information that is stored in memory.

The present disclosure provides a solution that provides for dynamically switching between multiple planning graphs at runtime (i.e., reconfiguring the processor) in a more efficient manner, providing several improvements over other designs. For example, consider a robot with an end effector that can grasp objects. The robot arm collides with different parts of 3D space when holding something than when not holding something. One example is the robot arm 106 holding a big ball at the end of the arm with the end effector. The planning graph corresponding to when the robot 102 is "holding nothing" doesn't work if the robot 102 is holding something. Conversely, one could very conservatively use the "holding something" planning graph even if the robot 102 isn't holding anything, but that is both inefficient and would require the use of a single planning graph corresponding to the scenario in which the robot 102 is holding the largest possible object. Instead, in various embodiments, the system 200 builds a family of planning graphs corresponding to different possible characteristics, e.g., "holding nothing", "holding a small sphere of size x", "holding a rectangular prism of size y", etc. These planning graphs may be swapped in and out from the planning graph edge information memory 284 by the processor 212*a* as the robot 102 picks things up and puts them down. This solution also applies to a robot whose end effector changes at times. For example, the robot 102 may be in an arrangement having a first end effector with a first set of dimensions. This first end effector may be swapped for a second end effector with a second set of dimensions. When the first end effector is swapped for a second end effector with a second set of dimensions the robot 102 will be in a different arrangement having the second end effector. Where the dimensions of the second set of dimensions are different from the dimensions of the first set of dimensions, the volume swept by the robot changes when the end effectors are swapped. Also for example, where the robot is an autonomous or partially autonomous vehicle, the vehicle may have a first set of dimensions in a first arrangement during a first period and the same vehicle may have a second set of dimensions in a second arrangement during a second period. For instance, a vehicle may be empty in a first arrangement and fully loaded in a second arrangement, changing the weight of the vehicle and potentially changing a height of the vehicle above a road, a clearance under the vehicle, or even a trajectory of a vehicle, for instance as it corners around a turn or curve. Where the dimensions of the second set of dimensions are different from the dimensions of the first set of dimensions, the volume swept by the vehicle changes between the first and the second arrangements. Likewise, where the trajectory changes between the first and the second arrangements the volume swept by the vehicle changes between the arrangements. The system 200 thus stores different planning graphs in planning graph edge information memory 284 for different end effectors.

Planning graphs take significant time and resources to build, but with the solutions provided herein, one would only have to do that once, for example, prior to runtime. Once the planning graphs are generated, they may all be stored in planning graph edge information memory 284 and it is relatively quick and efficient for the processor 212*a* to swap them in and out, or select which one to use based on the current characteristic of the robot 102, such as when the robot is grasping an object of a particular size.

As noted above, some pre-processing activities may be performed before runtime and thus, in some embodiments, these operations may be performed by remote processing devices, which are linked through a communications network to the robot control system 200 via network interface 260. For example, a programming phase allows preparation of the robot for the problem of interest. In such embodiments, extensive preprocessing is leveraged to avoid runtime computation. Precomputed data regarding the volume in 3D space swept by the robot 102 when making the transition in the planning graph from one state to another state represented by edges in the roadmap may be stored in planning graph edge information memory 284 and accessed by the processor 212a during runtime. The system 200 may also build a family of planning graphs prior to runtime corresponding to different possible changing dimensional characteristics of the robot that may occur during runtime. The system 200 then stores such planning graphs in planning graph edge information memory 284.

During the runtime phase, the sensors 282 send perception data to processor 212a. The perception data may be a stream of which voxels or boxes that are present in the current environment and are stored in on-chip environment memory 294. Using Boolean circuitry to compare the perception data retrieved from the environment memory 294 to the information stored in the planning graph edge information memory 284, the processor 212a calculates which motions avoid collision and selects a corresponding path in the planning graph for the robot 102 to follow. The processor 212a then runs and returns the resulting path to the actuator system 266.

FIG. 2 shows a robot control system 200, such as that for robot 102, comprising one or more processor(s), represented by processor 212a, and one or more associated nontransitory machine-readable storage media, such as system memory 214, planning graph edge information memory 284 and computer-readable media 226 associated with disk drive 224. The associated nontransitory computer- or processor-readable storage media, including system memory 214, planning graph edge information memory 284 and computer-readable media 226 associated with disk drive 224, are communicatively coupled to the processor 212a via one or more communications channels, such as system bus 216. The system bus 216 can employ any known bus structures or architectures, including a memory bus with memory controller, a peripheral bus, and/or a local bus. One or more sensors 282 and an actuator system 266 are also communicatively coupled to the processor 212a via system bus 216. One or more of such components may also or instead be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The robot control system 200 may also be communicably coupled to remote systems, e.g., desktop computer, laptop computer, ultraportable computer, tablet computer, smartphone, wearable computer (not shown) that are directly communicably coupled or indirectly communicably coupled to the various components of the robot control system 200 via the network interface 260. Such remote systems may be used to program, configure, control or otherwise interface with or input data to the robot control system 200 and various components within the robot control system 200. Such a connection may be through one or more communications channels, for example, one or more wide area networks (WANs), for instance, the Internet, using Internet protocols. As noted above, pre-runtime calculations (e.g., generation of the family of planning graphs) may be performed by a system that is separate from the robot 102 or other robot, while runtime calculations may be performed on the processor 212 that is on the robot 102 since it is important for the system 200 to be able to change planning graphs to react in real time to changing physical dimensions of the robot 102.

Unless described otherwise, the construction and operation of the various blocks shown in FIG. 2 are of conventional design or are described in International Patent Application No. PCT/US2017/036880, filed Jun. 9, 2017, entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; and/or U.S. Patent Application No. 62/616,783, filed Jan. 12, 2018, entitled "APPARATUS, METHOD AND ARTICLE TO FACILITATE MOTION PLANNING OF AN AUTONOMOUS VEHICLE IN AN ENVIRONMENT HAVING DYNAMIC OBJECTS" and are incorporated herein by reference, in their entirety. As a result, such blocks need not be described in further detail, as they will be understood by those skilled in the relevant art in view of the references incorporated by reference herein.

The robot control system 200 may include one or more processing units 212, the system memory 214, the planning graph edge information memory 284 and the system bus 216 that couples various system components including the system memory 214 and the planning graph edge information memory 284 to the processing units 212. In some embodiments, the planning graph edge information memory 284 may be, or be part of, the system memory 214. The processing units may be any logic processing unit, such as one or more central processing units (CPUs) 212a, digital signal processors (DSPs) 212b, application-specific integrated circuits (ASICs), field programmable gate arrays (FPGAs), etc. The system memory 214 may include read-only memory ("ROM") 218 and random access memory ("RAM") 220. The planning graph edge information memory 284 may include RAM, such as DRAM. A basic input/output system ("BIOS") 222, which can form part of the ROM 218, contains basic routines that help transfer information between elements within the robot control system 200, such as during start-up.

The robot control system 200 may include a disk drive 224, which may be, for example, a hard disk drive for reading from and writing to a hard disk, a flash memory drive for reading from and writing to removable flash memory devices, an optical disk drive for reading from and writing to removable optical disks, or a magnetic disk drive for reading from and writing to magnetic disks. The robot control system 200 may also include any combination of such disk drives in various different embodiments. The disk drive 224 may communicate with the processing units 212 via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the robot control system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to perform one or more of: generating one or more discretized representations of robot swept volumes associated with edges of planning graphs; determining which of a number of discretizations to use to generate discretized representations of robot swept volumes; generating discretized representations of the environment 100 in which the robot will operate, including obstacles in the environment 100; determining which of a number of discretizations to use to generate a discretized representation of the environment 100; determining a plurality of planning graphs; storing the determined plurality of planning graphs and respective sets of edge information; generating information that represents a volume swept by at least a portion of the robot in transitioning between the states represented by the nodes of the planning graphs; performing a collision assessment on edges of a planning graph; providing sets of edge information for the planning graphs; identifying one or more optimized results from planning graphs; collision checking for collisions between discretized representations of swept volumes associated with edges of planning graphs and discretized representations of obstacles in the environment 100 in which the robot 102 will operate; determining whether the optimization produces any collision-free paths for the robot; and implementing a motion plan for the robot. Application programs 238 may additionally include one or more machine-readable instruction sets that cause the processor(s) 212 to perform other operations of perception (via sensors 282), planning graph construction, collision detection, and path search as described herein and in the references incorporated herein by reference.

Application programs 238 may additionally include one or more machine-readable instruction sets that cause the processor(s) 212 to generate respective sets of planning graph edge information that represent different volumes swept by the robot 102 in transitioning between states corresponding to when the robot 102 has different dimensions and store a plurality of planning graphs in planning graph edge information memory 284 corresponding to the respective sets of planning graph edge information.

Application programs 238 may additionally include one or more machine-readable instruction sets that cause the processor(s) 212 to, for a first discretized representation of an environment 100 in which the robot 102 will operate, supply and store in environment memory 294 at least a portion of the first discretized representation of the environment 100; for each edge of the planning graph, provide and store a respective set of edge information in planning graph edge information memory 284; and identify any of the edges of the planning graph that the corresponding transition would result in a collision between at least a portion of the robot 102 and at least a portion of at least one of the one or more obstacles, such as obstacle A 112 and obstacle B 104 in the environment 100.

The term "environment" is used in the present example to refer to the robot's current workspace, including obstacles. The term "task" is used in the present example to refer to a robot task in which the robot 102 must get from Pose A to Pose B (perhaps grasping or dropping something) without colliding with obstacles in its environment. The term "scenario" is used in the present example to refer to a class of environment/task pairs. For example, a scenario could be "pick-and-place tasks in an environment with a 3-foot table and between x and y obstacles with sizes and shapes in a given range." There may be many different task/environment pairs that fit into such criteria, depending on the locations of goals and the sizes and shapes of obstacles. The system 200 may include one or more remote processing devices, which are linked through a communications network via network interface 260. Such one or more remote processing devices may execute one or more machine-readable instruction sets that cause the system 200 to generate a respective discretization of a representation of an environment 100 in which the robot 102 will operate for pairs of tasks and environments of various different scenarios. In an example embodiment, at least two of the respective discretizations comprise a respective set of voxels. The voxels of the respective discretizations may be non-homogenous in at least one of size and shape within the respective discretization. Also, a respective distribution of the non-homogeneousness of the voxels of the respective discretizations may be different from one another. In particular, the discretizations may comprise a respective set of voxels, where the voxels of at least two of the respective discretizations are non-homogenous in at least one of size and shape within the respective discretization, and a respective distribution of the non-homogeneousness of the voxels of at least two of the respective discretizations is different from one another. The Application programs 238 may include one or more machine-readable instruction sets that cause the processor(s) 212 to then assess an effectiveness of the generated respective discretizations of the representation of the environment 100 in which the robot will operate and store the generated respective discretizations that are assessed to be the most effective for particular scenarios.

Application programs 238 may additionally include one or more machine-readable instruction sets that cause the processor(s) 212 to, based at on an identified scenario that classifies a pair of a task which the robot 102 will perform and the environment 100 in which the robot will operate, determine which of a number of discretizations to use to generate a number of swept volumes that represent respective regions through which the robot 102 will pass when transitioning between one state of the robot and another state of the robot 102; and for each of a plurality of edges in a planning graph, determine a respective swept volume of the edge using the determined discretization. The application programs 238 may additionally include one or more machine-readable instruction sets that cause the processor(s) 212 to store the determined swept volume's respective discretizations of the representation of the environment 100 in which the robot 102 will operate that is assessed to be the most effective for the identified scenario.

Application programs 238 may additionally include one or more machine-readable instruction sets that cause the processor(s) 212 to, based at least in part on an identified scenario that classifies a pair of tasks which the robot 102 will perform and an environment 100 in which the robot operates, determine which of a number of discretizations to use to generate a discretized representation of the environment 100. Application programs 238 may additionally include one or more machine-readable instruction sets that cause the processor(s) 212 to receive sensor information produced by one or more sensors 282 that sense the environment 100 and generate a discretized representation of the environment, including obstacles, if any, in the environment using the determined discretization. A plurality of voxels of the determined discretization may be non-homogenous in at least one of size and shape within the respective discretization, and a respective distribution of the non-homogeneousness of the voxels of the determined discretization may be different from that of another one of the number of discretizations.

Application programs 238 may additionally include one or more machine-readable instruction sets that cause the processor(s) 212 to perform collision checking for multiple planning graphs between edges of the planning graphs and any obstacles in an environment in which the robot will operate. The processor(s) 212 may perform such collision checking on each planning graph, temporarily update the planning graph accordingly, and perform an optimization and determine whether the optimized results, if any, from the updated planning graph meet a satisfaction condition. If the satisfaction condition is not met, then the processor(s) 212 may move to the next planning graph and perform the same operation. Once a planning graph is found in which the satisfaction condition is met, the processor(s) 212 apply a transition identified by one of the optimized results from the planning graph which met the satisfaction condition to the robot 102.

Application programs 238 may additionally include one or more machine-readable instruction sets that cause the processor(s) 212 to perform various other methods described herein, including, but not limited to, those illustrated in FIGS. 6 through 10.

In various embodiments, one or more of the operations described above may be performed by one or more remote processing devices of the system 200, which are linked through a communications network via network interface 260 or by one or more processor(s) 212 that are located on the robot 102.

While shown in FIG. 2 as being stored in the system memory 214, the operating system 236, application programs 238, other programs/modules 240, and program data 242 can be stored on associated computer-readable media 226 of the disk drive 224.

The processor(s) 212 may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks shown in FIG. 2 are of conventional design. As a result, such blocks need not be described in further detail herein, as they will be understood by those skilled in the relevant art.

Figure 3:
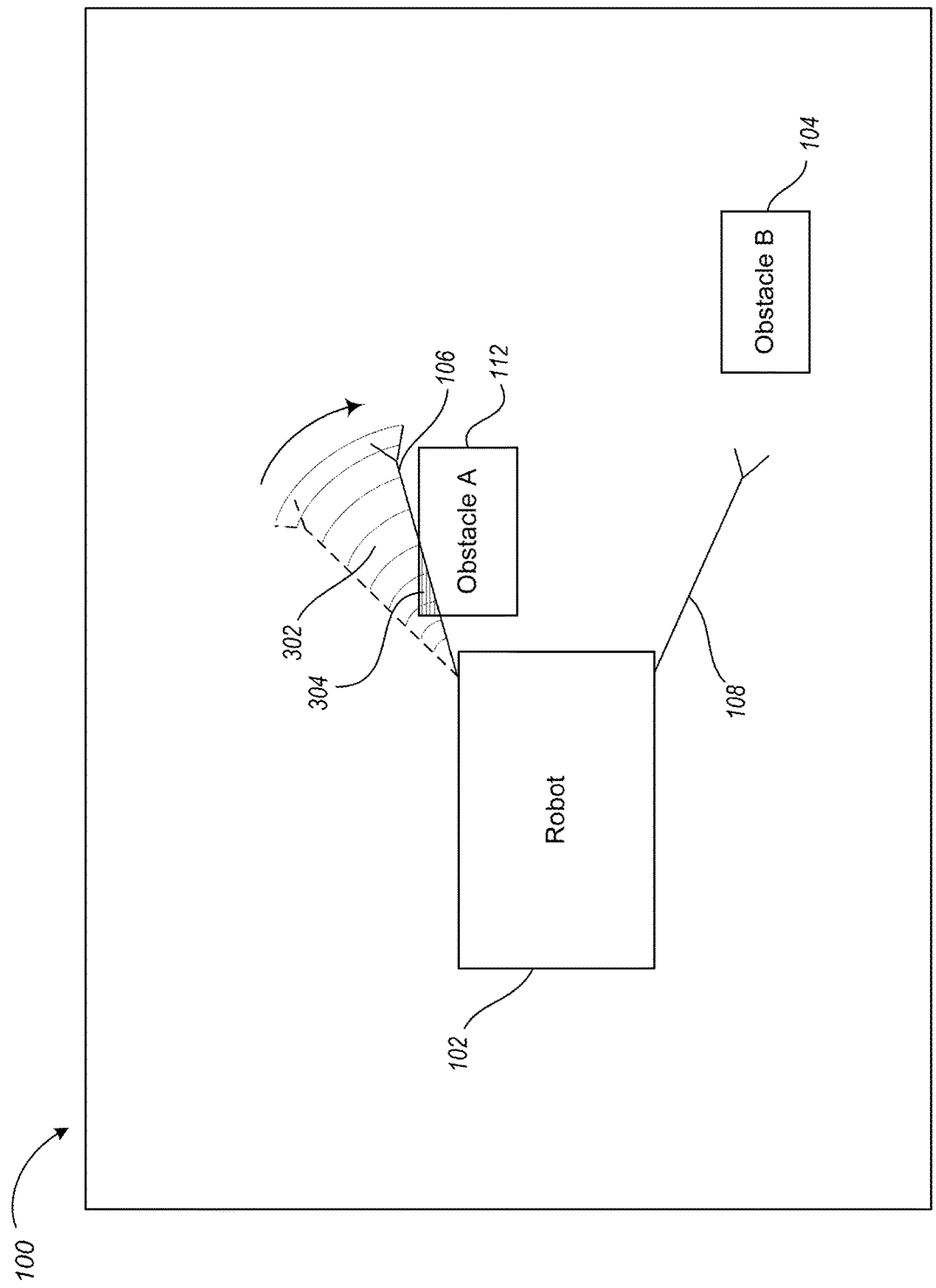
FIG. 3 is a schematic view of the environment of FIG. 1 in which the robot may operate, illustrating the robot transitioning from one position in three dimensional (3D) space to another position in 3D space in the environment and a representation of a volume swept by an appendage of the robot in transitioning between one position in 3D space to another position in 3D space, according to one illustrated embodiment.

FIG. 3 is a schematic view of the environment 100 of FIG. 1 in which the robot 102 may operate, illustrating the robot 102 transitioning from one position in 3D space to another position in 3D space in the environment 100 and a representation of a volume swept by an appendage of the robot when making the transition from one position in 3D space to another position in 3D space, according to one illustrated embodiment.

In the example illustrated in FIG. 3, the robot 102 is shown as having two appendages, arm 106 and arm 108. In one example, the robot may change a position in 3D space by moving arm 106 from a first position to a second position as shown in FIG. 3. The volume in 3D space swept by the robot 102 when making the transition between one position in 3D space and another position in 3D space by moving arm 106 from a first position to a second position as shown in FIG. 3 is represented by region 302. However, as shown in FIG. 3, such a transition would cause the robot arm 106 to collide with obstacle A 112 in region 304.

Thus, to facilitate avoiding collisions, at design time (prior to runtime), one or more planning graphs are generated by the system 200 to determine which areas are occupied by the robot 102 when making various transitions from one state to another state. For example, an edge of a planning graph for the robot 102 has some number of voxels (or boxes) corresponding to the volume in 3D space swept by the robot 102 corresponding to region 302. Those voxels or boxes swept by the robot 102 corresponding to region 302 when making the corresponding transition in the planning graph may be stored as corresponding to an edge of the planning graph in off-chip memory devoted to the planning graph, such as in planning graph edge information memory 284. Then, at runtime, the obstacle voxels (or boxes) representing environment 100, including obstacle A 112 (and also obstacle B 104) are streamed into processor 212a in the form of an occupancy grid and stored on the on-chip environment memory 294. The system 200 determines which voxels are occupied (based on the occupancy grid), and determines to not use any motion that would collide with any currently occupied voxel. In particular, for each edge voxel (or box) representing a portion of the swept volume of an edge, when it is streamed in from planning graph edge information memory 284, the processor determines whether it collides with any of the obstacle voxels (or boxes) that have been stored in environment memory 294 based on the occupancy grid. If the edge voxel (or box) collides with any of the obstacle voxels (or boxes), the system 200 determines a collision with that edge in the planning graph and will determine to not use the motion of the robot 102 associated with that edge in the planning graph.

For example, prior to executing the motion of the robot arm 106 depicted in FIG. 3, the system 200 would start to stream in the edge voxels (or boxes) of all the edges of the applicable planning graph from planning graph edge memory 284. For each edge, as the processor 212a encounters each edge voxel (or box), it would check to see if any edge voxel (or box) collides with any of the obstacle voxels (or boxes) stored in environment memory 294 (including those for obstacle A 112). As shown in FIG. 3, any edge voxel (or box) within region 304 would result in such a collision because obstacle voxels (or boxes) of obstacle A 112 stored in environment memory 294 occupy that same region according to the occupancy grid. As soon as the processor 212a encounters an edge voxel (or box) that collides with any of the obstacle voxels (or boxes), the processor 212a then determines to not use that edge of the planning graph. Once finished processing the edges of the planning graph, the processor 212a determines a path within the planning graph that would cause the robot to move from the initial position to the goal position using the remaining edges that have not been determined to collide with the obstacle voxels (or boxes) stored in environment memory 294.

The system 200 may also make decisions regarding how to represent the swept volume represented by each of the planning graphs as well as how to represent the obstacles in the environment 100. Such decisions may include decisions made by the processor 212*a* regarding how the discretization is to be performed, such as, for example, whether to represent the swept volume with voxels or boxes, the shape and size of the voxels or boxes to use, whether to use a discretization that is non-uniform in size and/or shape of the voxels or boxes used, and in which scenarios to use different shapes and/or sizes of voxels or boxes. In various embodiments, one or more of such operations described above to make decisions regarding how to represent the swept volume represented by each of the planning graphs as well as how to represent the obstacles in the environment 100 may be performed by one or more remote processing devices of the system 200, which are linked through a communications network via network interface 260 or by one or more processor(s) 212 that are located on the robot 102.

In particular, the system 200 may decide that the working space of the robot 102 will be discretized into voxels (which may later be grouped into boxes). One example implementation performs uniform quantization in each of the 3 dimensions. However, it may be advantageous to have non-cube-shaped voxels and/or voxels that are smaller/larger in different parts of the robot's workspace. For example, one embodiment uses smaller voxels (finer resolution) in the space right in front of the robot 102 and larger voxels (coarser resolution) at the extreme end of the robot's reach. Thus, various embodiments may use non-uniform quantization and/or use of non-cube-shaped voxels. The present disclosure also provides an algorithm for how the system 200 chooses the voxel sizes and/or shapes.

One example embodiment uses a training algorithm for execution prior to runtime to determine which voxel sizes and shapes may be better to use for various different scenarios. The system 200 is trained by using a given or generated large set of task/environment pairs from one or more scenarios. The system 200 then chooses the discretization that is assessed to be most effective over the large set of training samples.

For example, for any given environment/task pair, there is an optimal discretization (or multiple discretizations that are equally optimal). The system 200 may test/train on T environment/task pairs, where T is a large number, and then record the optimal discretization for each. This may result in many different discretizations, each of which is optimal for only one or a small number of environment/task pairs. After testing all T environment/task pairs, the system selects the discretization that is assessed to be most effective over the whole set of samples. This approach would also involve trying every possible discretization on every possible environment/task pair, which would be intractable.

To overcome the above problem, the system 200 performs training like that explained above, except that the system 200 considers a finite number of possible discretizations, G. For each environment/task pair, the system records which of the G discretizations provided is assessed to be most effective. After processing all T environment/task pairs, the system 200 selects the discretization that is assessed to be most effective in the most environment/task pairs.

As an example, the robot 102 may be facing a box of space in front of it. The system may determine to discretize the space such that 6-bits are used to describe the position in each dimension (i.e., there are $2^6$ possible positions on each axis). This results in $2^{18}$ voxels, each of which has a unique 18-bit ID. At design time, the system 200 precomputes the swept volume for every edge's motion, and records it as the collection of voxel IDs in that swept volume. If the swept volume even partially intersects a voxel, it is included in the collection of voxel IDs in that swept volume. This is why using a finer resolution is better. Then, at runtime, the sensors 282 tell the processor 212*a* what is in front of the robot 102, but at a much finer granularity than the voxels representing the precomputed swept volume, so the system 200 processes the sensor input and communicates to the processor 212*a* which of the voxels are currently occupied. In some embodiments, the processor 212*a* processes the sensor input and in other embodiments, there are separate processors, such as those of the sensors 282, which processes the sensor input and communicates to the processor 212*a*. The processor 212*a* compares the voxels or boxes currently in the environment based on the information stored in environment memory 294 to the voxels or boxes listed for each edge of the planning graph edge information stored in planning graph edge information memory 284 to determine which edges are currently in collision. In such embodiments, it is important that the same discretization is used at design time as at runtime in order to enable the comparison.

When the system 200 selects to use non-uniform discretization, the system 200 may still use 18-bit voxel IDs and $2^{18}$ voxels, but the voxels need not be cubes (or they could be cubes but not of all the same size). Once again, it is important in this embodiment that the system uses the same discretization at design time as at runtime. When using a non-uniform discretization, the system 200 selects what each voxel's size and shape is, using training such as that described above, such that the system picks the voxel sizes and shapes that will be used at design time and at runtime that are assessed to be most effective. The evaluation criteria used in such training may include criteria regarding the fraction of tasks that can be solved (e.g., the system 200 can find some collision-free path to accomplish the goal of the robot 102) and the quality of the paths that are found.

Figure 4A:
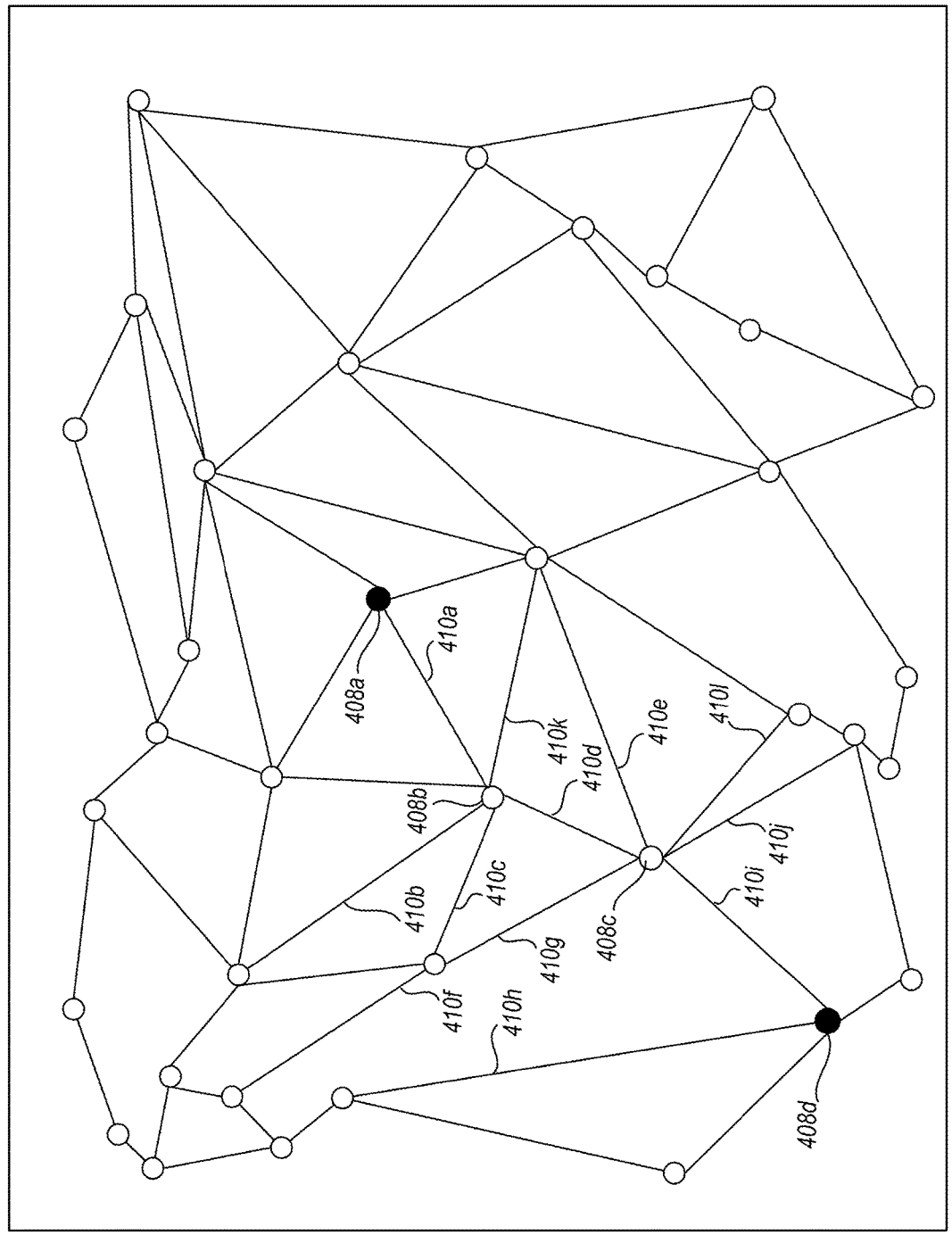
FIG. 4A is an example motion planning graph for the robot of FIG. 1, including edges of the planning graph for which it has been determined the corresponding transition would result in a collision between the robot and one or more obstacles in the environment, according to one illustrated embodiment.
Figure 4B:
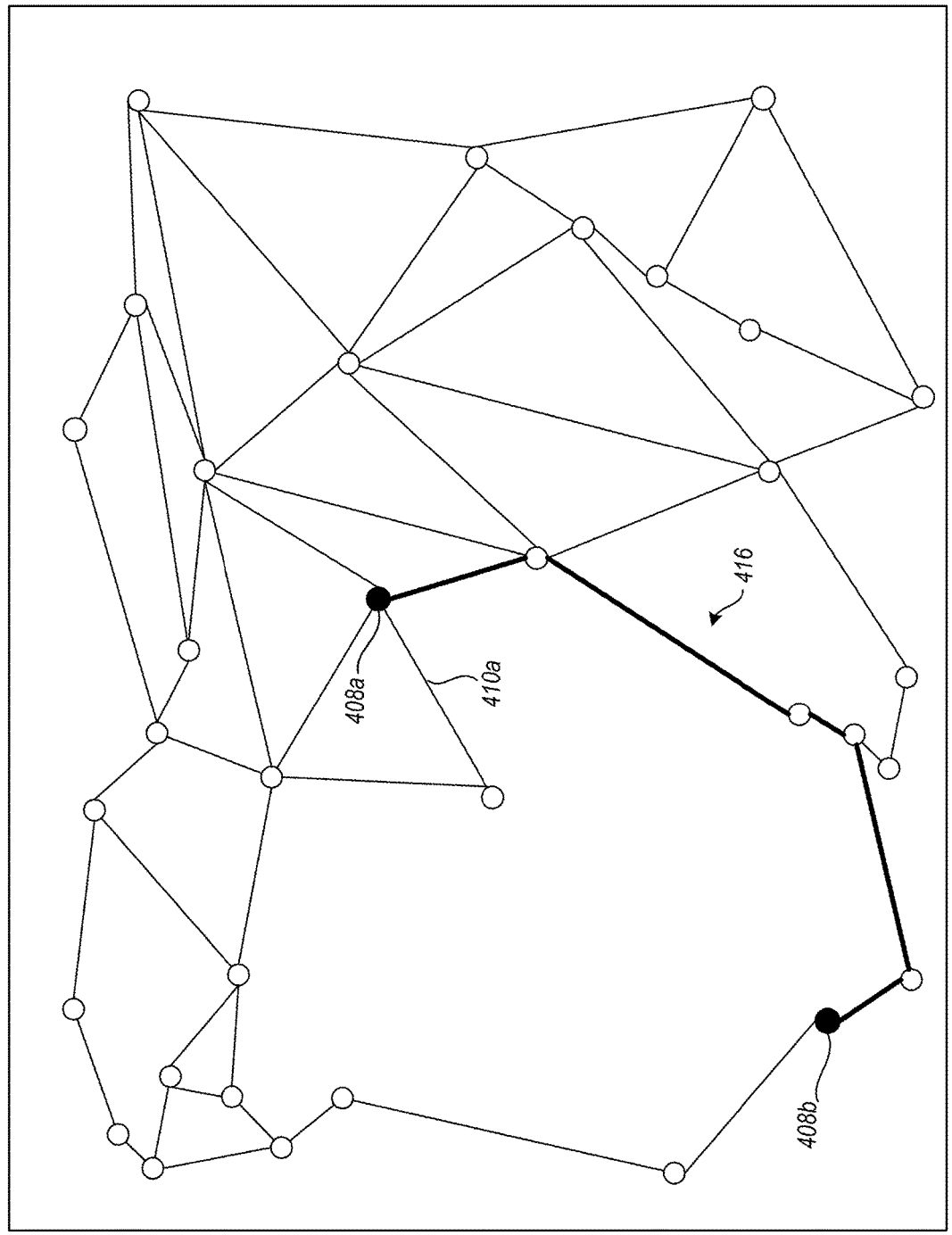
FIG. 4B is an example motion planning graph for the robot of FIG. 1 in which edges of the planning graph have been removed for which it has been determined the corresponding transition would result in a collision between the robot and one or more obstacles in the environment, according to one illustrated embodiment.

FIG. 4A is an example motion planning graph 400 for the robot 102 of FIGS. 1 and 3, including edges of the planning graph 400 for which it has been determined the corresponding transition would result in a collision between the robot 102 and one or more obstacles in the environment 100, according to one illustrated embodiment. FIG. 4B is an example motion planning graph 400 in which edges of the planning graph 400 have been removed for which it has been determined the corresponding transition would result in a collision between the robot 102 and one or more obstacles in the environment 100, according to one illustrated embodiment. Each node of the planning graph 400 represents a state of the robot 102 and each edge of the planning graph 400 represents a transition of the robot 102 from one state to another state. For example, edge 410*a* represents a transition between a state of the robot 102 represented by node 408*a* and a state of the robot 102 represented by node 408*b*. Edge 410*i* represents a transition between a state of the robot 102 represented by node 408*c* and a state of the robot 102 represented by node 408*d*.

Each edge of the planning graph 400 for the robot 102 has some number of voxels (or boxes) corresponding to the volume in 3D space swept by the robot 102 when making the transition in the planning graph 400 from one state to another state represented by that edge. Such information may be stored as planning graph edge information in off-chip planning graph edge information memory 284, such that the system 200 can swap out different planning graphs to accommodate changing dimensions of the robot 102. Using information received from the sensors 282 representing the current environment at runtime, the system 200 determines which voxels (or boxes) are currently occupied, and the system 200 determines to not use any motion that would collide with any currently occupied voxel (or box).

In some embodiments, the system determines to not use any motion that would collide with any occupied voxel (or box) by comparing at runtime the information received from the sensors 282 and stored in on-chip environment memory 294 representing the current environment (and obstacles therein) with the planning graph edge information stored in planning graph edge information memory 284. Based on this comparison, the system 200 determines which planning graph edges represent transitions (and thus which corresponding motions) that would result in a collision between the robot 102 and one or more obstacles in the environment 100. As an example, FIG. 4A shows edges 410b, 410c, 410d, 410e, 410f, 410g, 410h, 410i, 410j, 410k and 410l have been determined to represent transitions (and thus which corresponding motions) that would result in a collision between the robot 102 and one or more obstacles in the environment 100.

For example, in order for the robot 102 to achieve a goal of moving from a state represented by node 408a to a state represented by node 408d, the robot 102 would have to avoid transitions represented by edges 410b, 410c, 410d, 410e, 410f, 410g, 410h, 410i, 410j, 410k and 410l that have been determined to represent transitions that would result in a collision between the robot 102 and one or more obstacles in the environment 100. Thus, FIG. 4B shows the planning graph with such edges removed and a potential path 416 in planning graph 400 identified by the system 200 in which the robot 102 may follow to achieve a goal of moving from the state represented by node 408a to the state represented by node 408d without colliding with one or more obstacles in the environment 100.

Figure 5:
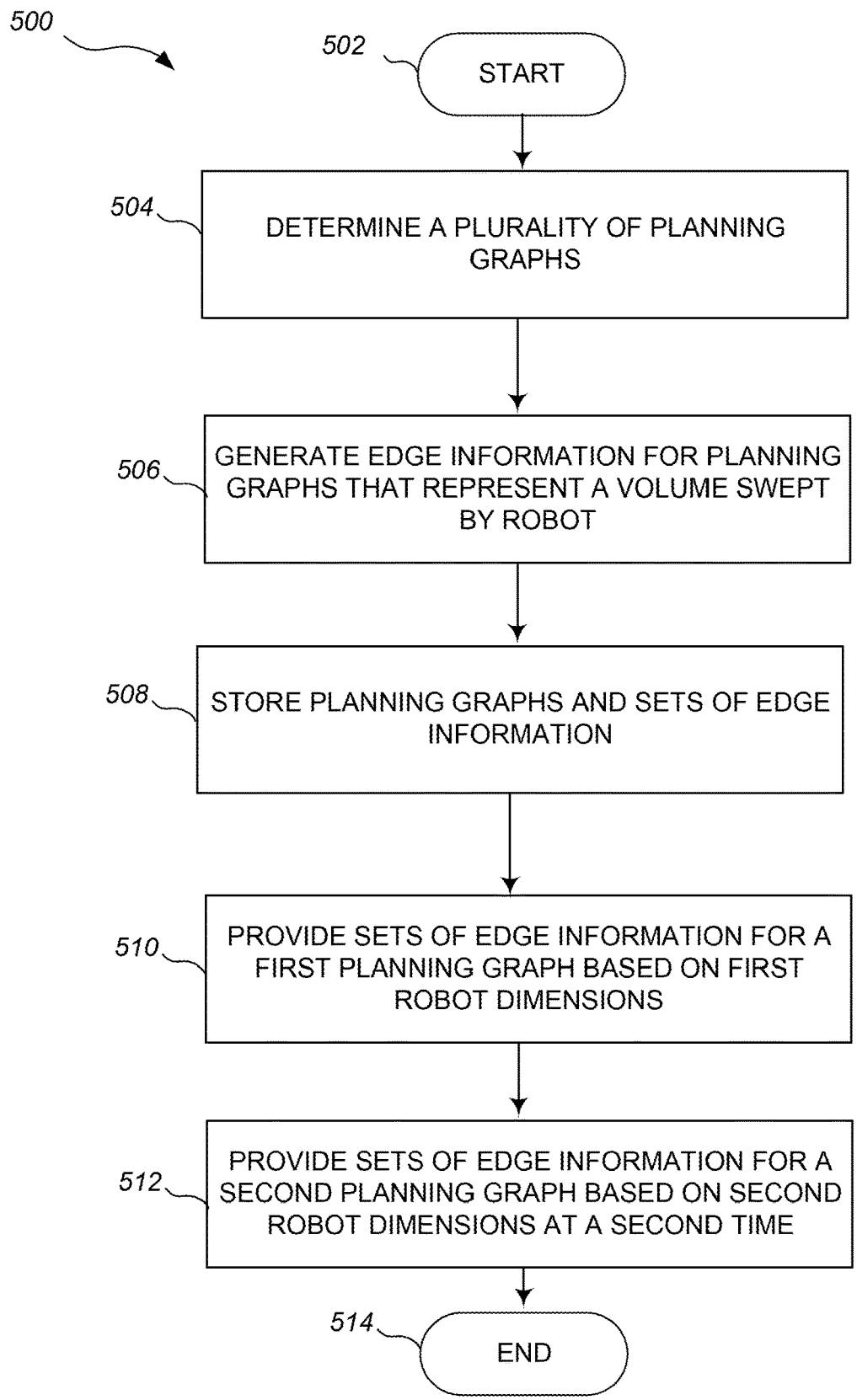
FIG. 5 is a flow diagram showing a method of operation in a robot control system to facilitate motion planning by providing edge information of different planning graphs according to particular circumstances, according to one illustrated embodiment.

FIG. 5 is a flow diagram showing a method 500 of operation in a robot control system 200 to facilitate motion planning by providing edge information of different planning graphs according to particular circumstances, according to one illustrated embodiment. The method 500 of operation in a robot control system 200 to facilitate motion planning by providing edge information of different planning graphs according to particular circumstances commences at 502.

At 504, for a robot 102 that will operate in an environment, the system 200 determines a plurality of planning graphs. Each planning graph respectively comprises a plurality of nodes connected by a plurality of edges, each node representing, implicitly or explicitly, variables that characterize a respective state of the robot 102. Each edge represents a transition between a respective pair of the states of the robot 102. The respective pairs of states are represented by respective ones of a pair of nodes that are coupled by a respective edge in the respective planning graph.

At 506, for at least two or more of the edges of each of the planning graphs, the system 200 generates a respective set of edge information that represents a volume swept by at least a portion of the robot 102 in transitioning between the states represented by the respective nodes that are coupled by the respective edge. In at least one embodiment, the system 200 generates the respective set of edge information before runtime.

At 508, the system 200 stores the plurality of planning graphs and the sets of edge information in at least one nontransitory processor-readable storage.

At 510, based on at least a portion of the robot 102 having a first set of physical dimensions at a first time, the system 200 provides the sets of edge information for a first one of the planning graphs to at least one processor.

At 512, based on at least a portion of the robot 102 having a second set of physical dimensions at a second time, the system 200 provides the sets of edge information for a second one of the planning graphs to the at least one processor. At least one dimension in the second set of physical dimensions is different than a corresponding one of the dimensions of the first set. The method 500 of operation in a robot control system 200 to facilitate motion planning by providing edge information of different planning graphs according to particular circumstances concludes at 514.

The robot 102 may have at least a first appendage that is selectively operable for movement with respect to the environment in which the robot 102 operates. The robot 102 may also have a first end effector attached to the first appendage. The first end effector is selectively operable for movement between at least a first and a second end effector arrangement (e.g., a grasped and un-grasped arrangement). The system 200 may determine that the first end effector attached to the first appendage is in a first end effector arrangement. For example, the end effector may be in an un-grasped or open position. This is an example of a first end effector arrangement. The end effector being in a grasped position is an example of a second end effector arrangement. The first set of physical dimensions represents a set of dimensions of the first end effector in the first end effector arrangement. In particular, the first set of physical dimensions are the physical dimensions of the robot when the end effector is in an un-grasped position. In such a case, providing the sets of edge information for a first one of the planning graphs to at least one processor is in response to the determination that the first end effector attached to the first appendage is in the first end effector arrangement (i.e., in an un-grasped or open position).

Also, the system 200 may determine that the first end effector attached to the first appendage is in a second end effector arrangement. For example, the end effector may be in grasped or closed position. This is an example of a second end effector arrangement. The end effector being in a un-grasped or open position is an example of a first end effector arrangement. In a case where the first appendage is in a second end effector arrangement (i.e., in a grasped or closed position), the second set of physical dimensions represents a set of dimensions of the first end effector in the second end effector arrangement. In particular, the first set of physical dimensions are the physical dimensions of the robot when the end effector is in a grasped position. Providing the sets of edge information for a second one of the planning graphs to at least one processor is then in response to the determination that the first end effector attached to the first appendage is in the second end effector arrangement (i.e., in an un-grasped or open position).

In some embodiments, the robot 102 has at least a first appendage that is selectively operable for movement with respect to the environment in which the robot 102 operates, and a first end effector is attached to the first appendage. The first end effector is selectively operable for movement between at least an un-grasped arrangement and a grasped arrangement. At least one of a size or shape of a volume occupied by the first end effector in the grasped arrangement is different from at least one of a size or shape of a volume occupied by the first end effector in the un-grasped arrangement. In such a case, the system 200 may determine that the first end effector attached to the first appendage is in the un-grasped arrangement. Providing the sets of edge information for a first one of the planning graphs to at least one processor is then in response to the determination that the first end effector attached to the first appendage is in the un-grasped arrangement.

Figure 6:
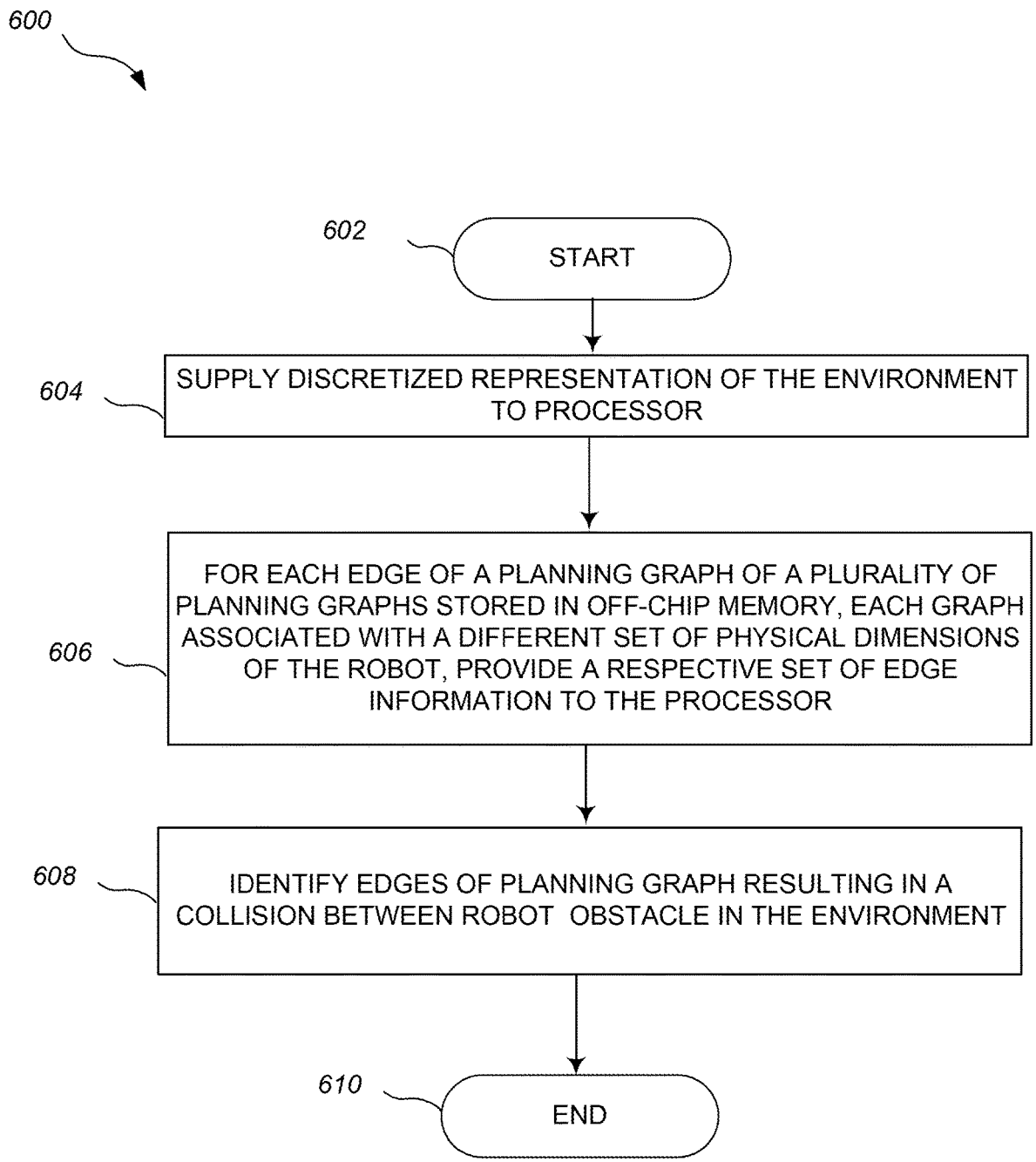
FIG. 6 is a flow diagram showing a method of operation in a robot control system to facilitate motion planning by identifying edges of a planning graph for which the corresponding transition would result in a collision, the planning graph being one of a plurality of planning graphs stored in off-chip memory, each of which is associated with a different set of physical dimensions of the robot, according to one illustrated embodiment.

FIG. 6 is a flow diagram showing a method 600 of operation in a robot control system 200 to facilitate motion planning by identifying edges of a planning graph for which the corresponding transition would result in a collision, the planning graph being one of a plurality of planning graphs stored in off-chip memory, each of which is associated with a different set of physical dimensions of the robot, according to one illustrated embodiment. The method 600 of operation in a robot control system 200 to facilitate motion planning by identifying edges of a planning graph for which the corresponding transition would result in a collision commences at 602.

At 604, for a first discretized representation of an environment in which at least a robot 102 will operate, the system 200 supplies at least a portion of the first discretized representation of the environment to at least one processor. The environment is occupied by one or more obstacles.

At 606, for each edge of a first planning graph, the system 200 provides a respective set of edge information to the at least one processor. The first planning graph is one of a plurality of planning graphs stored in off-chip memory relative the processor. Each planning graph of the plurality of planning graphs is associated with a different set of physical dimensions of the first robot. The respective set of edge information represents a volume swept by at least a portion of the robot 102 in transitioning between a pair of states of the robot 102. The pair of states of the robot 102 is represented by respective ones of a pair of nodes of the first planning graph. The nodes of the respective pair of nodes are coupled by a respective edge of the first planning graph and the respective edge represents a transition between the respective pair of states of the robot 102.

At 608, the system 200 identifies any of the edges of the first planning graph for which the corresponding transition would result in a collision between at least a portion of the robot 102 and at least a portion of at least one of the one or more obstacles in the environment. The method 600 of operation in a robot control system 200 to facilitate motion planning by identifying edges of a planning graph for which the corresponding transition would result in a collision concludes at 610.

Figure 7:
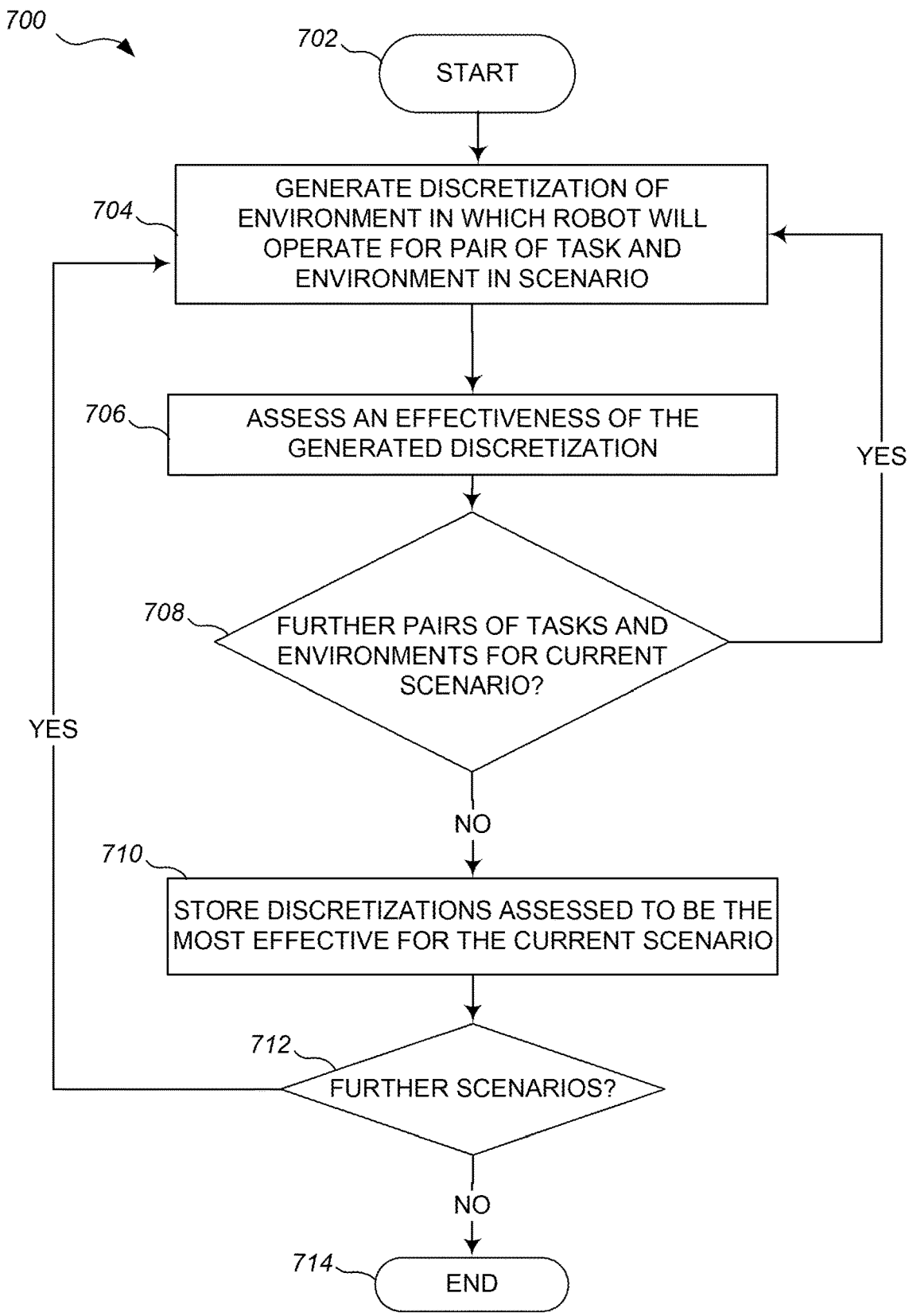
FIG. 7 is a flow diagram showing a method of operation in a robot control system to facilitate motion planning by assessing an effectiveness of generated non-uniform discretizations of a representation of the environment in which the robot will operate, according to one illustrated embodiment.

FIG. 7 is a flow diagram showing a method 700 of operation in a robot control system 200 to facilitate motion planning by assessing an effectiveness of generated non-uniform discretizations of a representation of the environment in which the robot 102 will operate, according to one illustrated embodiment. The method 700 of operation in a robot control system 200 to facilitate motion planning by assessing an effectiveness of generated non-uniform discretizations of a representation of the environment in which the robot 102 will operate commences at 702.

At 704, for each of a plurality of iterations, the system 200 generates a respective discretization of a representation of an environment in which a robot 102 will operate. The system 200 performs this for at least a first scenario that includes a set of a plurality of pairs of tasks and environments and for each of the pairs of tasks and environments of at least the first scenario. At least two of the respective discretizations comprise a respective set of voxels. The voxels of the at least two of the respective discretizations are non-homogenous in at least one of size and shape within the respective discretization. A respective distribution of the non-homogeneousness of the voxels of the at least two of the respective discretizations is also different from one another.

At 706, the system 200 assesses an effectiveness of the generated respective discretizations of the representation of the environment in which the robot will operate. The system 200 performs this for at least a first scenario that includes a set of a plurality of pairs of tasks and environments and for each of the pairs of tasks and environments of at least the first scenario.

At 708, the system determines whether there are further pairs of tasks and environments to process. If the system 200 determines there are further pairs of tasks and environments to process for the current scenario, the method 700 returns to 704 to continue generating the respective discretizations for the sets of pairs of tasks and environments included in the scenario and then assesses their effectiveness at 706. If the system 200 determines there are no further pairs of tasks and environments to process for the current scenario, the method 700 continues to 710.

At 710, the system 200 stores to at least one nontransitory processor-readable media at least the generated respective discretizations of the representation of the environment in which the robot will operate that is assessed to be the most effective for at least the first scenario.

Figure 8:
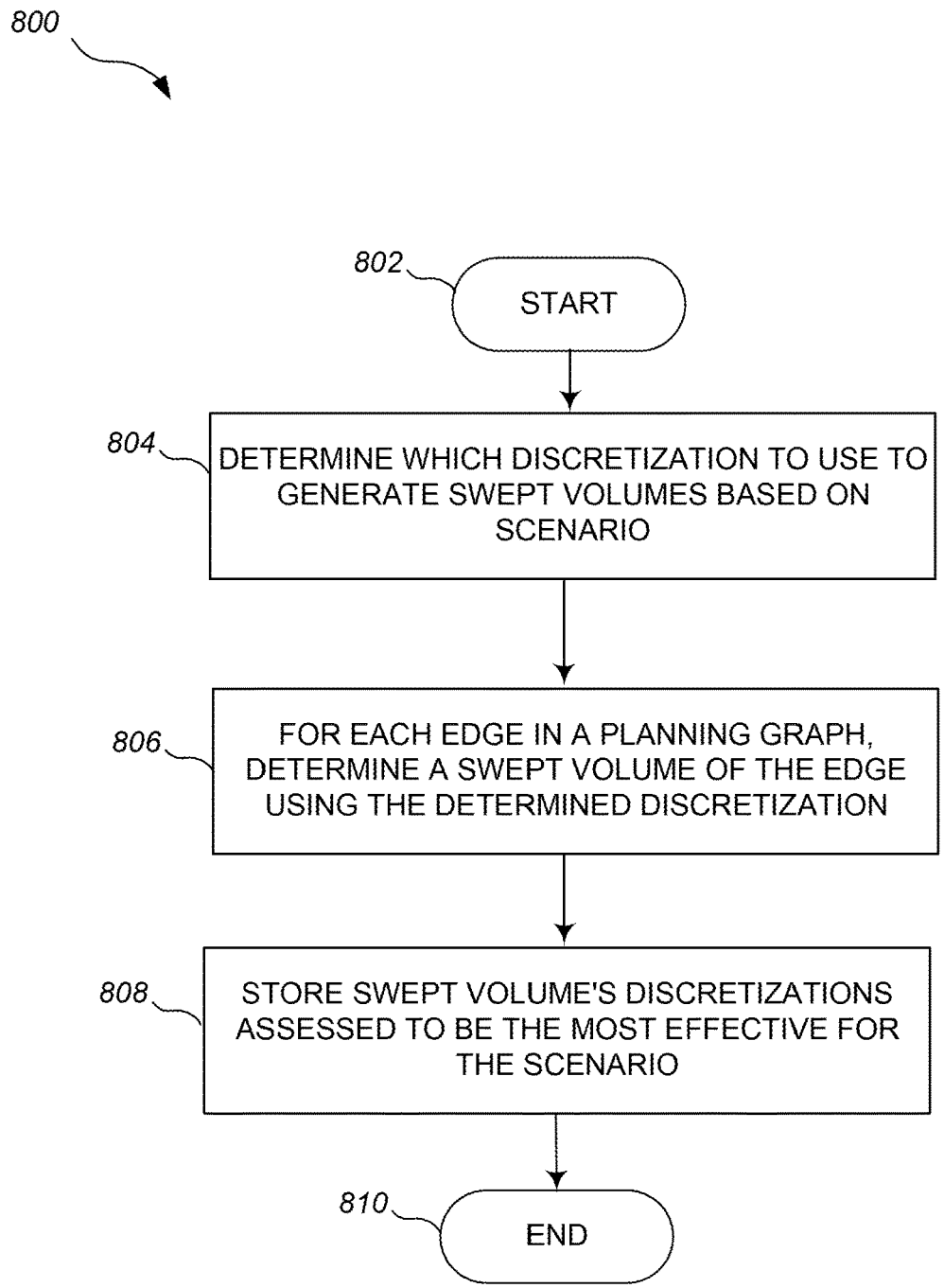
FIG. 8 is a flow diagram showing a method of operation in a robot control system to facilitate motion planning by determining which of a number of discretizations to use to generate a number of swept volumes that represent respective regions through which the robot will pass, according to one illustrated embodiment.

At 712, the system 200 determines whether there are further scenarios to process. If the system 200 determines there are further scenarios to process, the method 700 returns to 704 to continue generating the respective discretizations for the sets of pairs of tasks and environments included in the next scenario and assesses their effectiveness at 706. If the system 200 determines there are no further scenarios to process, the method 700 of operation in a robot control system 200 to facilitate motion planning by assessing an effectiveness of generated non-uniform discretizations of a representation of the environment in which the robot 102 will operate concludes at 714. In some embodiments, there may be one planning graph associated with multiple scenarios. In such embodiments, the system 200 may generate the respective discretizations for the sets of pairs of tasks and environments associated such a planning graph. FIG. 8 is a flow diagram showing a method 800 of operation in a robot control system 200 to facilitate motion planning by determining which of a number of discretizations to use to generate a number of swept volumes that represent respective regions through which the robot 102 will pass, according to one illustrated embodiment. The method 800 of operation in a robot control system 200 to facilitate motion planning by determining which of a number of discretizations to use to generate a number of swept volumes that represent respective regions through which the robot 102 will pass commences at 802.

At 804, based at least in part on an identified scenario that classifies a pair of a task which a robot 102 will perform and an environment in which the robot will operate, the system 200 determines which of a number of discretizations to use to generate a number of swept volumes that represent respective regions through which at least a portion of the robot 102 will pass when transitioning between one state of the robot 102 and another state of the robot 102. This determination may include selecting between at least two discretizations based on the identified scenario. In such a case, the voxels of the at least two of the respective discretizations are non-homogenous in at least one of size and shape within the respective discretization. Also, a respective distribution of the non-homogeneousness of the voxels of the at least two of the respective discretizations is different from one another.

At 806, for each of a plurality of edges in a planning graph, the system 200 determines a respective swept volume of the edge using the determined discretization. The planning graph comprises a plurality of nodes and a plurality of edges. Each node represents a respective one of a plurality of states of the robot. Each of the edges couples a pair of the nodes and represents a transition by the robot 102 between the states represented by the respective nodes coupled by the edge.

Figure 9:
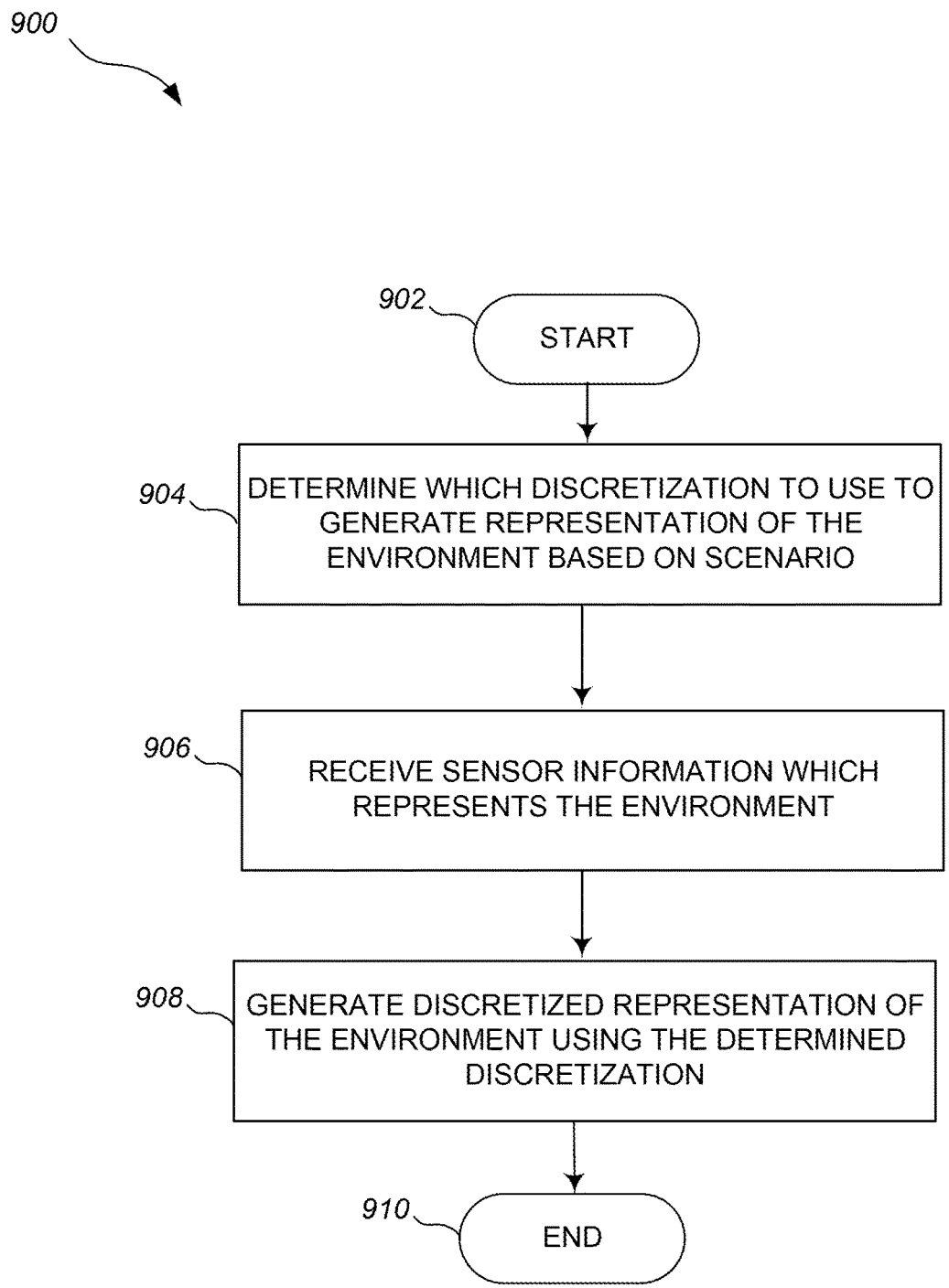
FIG. 9 is a flow diagram showing a method of operation in a robot control system to facilitate motion planning by generating a discretized representation of the environment in which the robot will operate using a determined discretization, according to one illustrated embodiment.

At 808, the system 200 stores to at least one nontransitory processor-readable media at least one of the determined swept volume's respective discretizations of the representation of the environment in which the robot 102 will operate that is assessed to be the most effective for at least the identified scenario. The method 800 of operation in a robot control system 200 to facilitate motion planning by determining which of a number of discretizations to use to generate a number of swept volumes that represent respective regions through which the robot 102 will pass concludes at 810. In some embodiments, the planning graph may be associated with multiple scenarios. FIG. 9 is a flow diagram showing a method 900 of operation in a robot control system 200 to facilitate motion planning by generating a discretized representation of the environment in which the robot 102 will operate using a determined discretization, according to one illustrated embodiment. The method 900 of operation in a robot control system 200 to facilitate motion planning by generating a discretized representation of the environment in which the robot 102 will operate using a determined discretization commences at 902.

At 904, based at least in part on an identified scenario that classifies a pair of a task which a robot 102 will perform and an environment in which the robot 102 operates, the system 200 determines which of a number of discretizations to use to generate a discretized representation of the environment, including obstacles, if any, in the environment.

At 906, the system 200 receives sensor information produced by one or more sensors 282 that sense the environment. The sensor information represents the environment, including obstacles, if any, in the environment.

At 908, the system 200 generates a discretized representation of the environment, including obstacles, if any, in the environment using the determined discretization. A plurality of voxels of the determined discretization are non-homogenous in at least one of size and shape within the respective discretization. A respective distribution of the non-homogeneousness of the voxels of the determined discretization is different from that of another one of the number of discretizations. The system generates the discretized representation of the environment using a distribution of voxel size and shape that matches a distribution of voxel size and shape used to generate a discretized representation of a swept volume. The method 900 of operation in a robot control system 200 to facilitate motion planning by generating a discretized representation of the environment in which the robot 102 will operate using a determined discretization concludes at 910.

Figure 10:
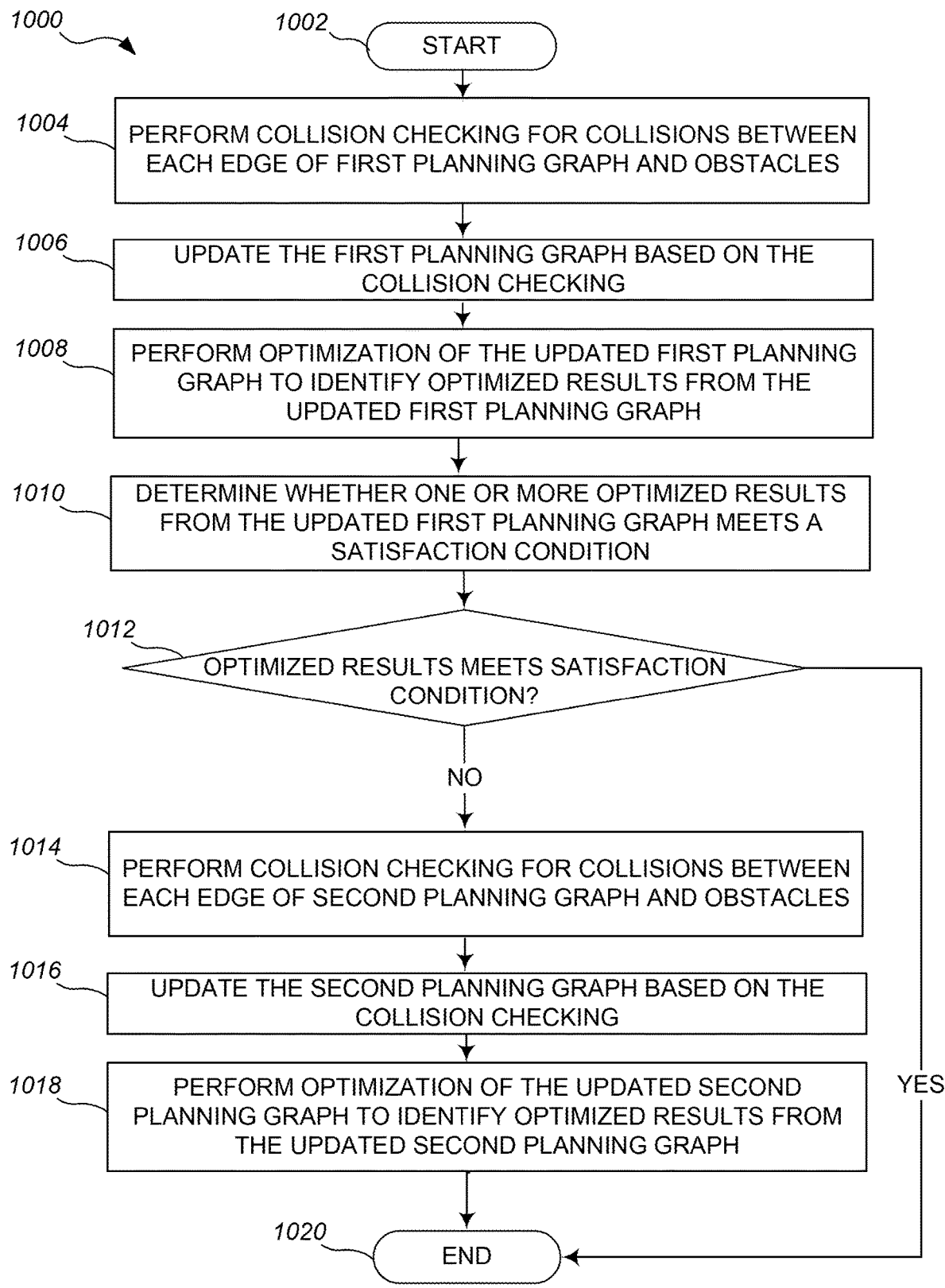
FIG. 10 is a flow diagram showing a method of operation in a robot control system to facilitate motion planning by determining whether optimized results of planning graphs meet satisfaction conditions, according to one illustrated embodiment.

FIG. 10 is a flow diagram showing a method 1000 of operation in a robot control system 200 to facilitate motion planning by determining whether optimized results of planning graphs meet satisfaction conditions, according to one illustrated embodiment. The method 1000 employs a plurality of planning graphs. Each planning graph respectively comprises a plurality of nodes connected by a plurality of edges. Each node represents, implicitly or explicitly, variables that characterize a respective state of the first robot and each edge represents a transition between a respective pair of the states of the first robot. The respective pair of states is represented by respective ones of a pair of nodes that are coupled by a respective edge in the respective planning graph. The method 1000 of operation in a robot control system 200 to facilitate motion planning by determining whether optimized results of planning graphs meet satisfaction conditions commences at 1002.

At 1004, for a first planning graph of the plurality of planning graphs, and for each of a plurality of edges of the first planning graph, the system 200 performs collision checking for collisions between a discretized representation of a swept volume associated with the edge and a discretized representation of any obstacles in an environment in which the robot will operate.

At 1006, the system 200 updates the first planning graph based on the collision checking.

At 1008, the system 200 performs an optimization of the updated first planning graph to identify one or more optimized results, if any, from the updated first planning graph.

At 1010, the system 200 determines whether the one or more optimized results, if any, from the updated first planning graph meets a satisfaction condition.

At 1012, if the system 200 determined that the one or more optimized results, if any, from the updated first planning graph did not meet the satisfaction condition, the method 1000 continues to 1014. If the system 200 determined that the one or more optimized results, if any, from the updated first planning graph met the satisfaction condition, the method 1000 concludes at 1020. In response to determining that the one or more optimized results, if any, from the updated first planning graph meets the satisfaction condition, the system 200 may apply a transition identified by one of the one or more optimized results from the updated first planning graph to the robot 102 (e.g., move the robot).

At 1014, in response to the system 200 determining that the one or more optimized results, if any, from the updated first planning graph did not meet the satisfaction condition, the system 200, for each of a plurality of edges of the second planning graph, performs collision checking for collisions between a discretized representation of a swept volume associated with the edge and a discretized representation of any obstacles in an environment in which the robot 102 will operate.

At 1016, the system 200 updates the second planning graph based on the collision checking.

At 1018, the system 200 performs an optimization of the updated second planning graph to identify one or more optimized results, if any, from the updated second planning graph. The method 1000 of operation in a robot control system 200 to facilitate motion planning by determining whether optimized results of planning graphs meet satisfaction conditions concludes at 1020.

The system 200 may also determine whether the one or more optimized results, if any, from the updated second planning graph meets a satisfaction condition. In response to determining that the one or more optimized results, if any, from the updated second planning graph meets the satisfaction condition, the system 200 may apply a transition identified by one of the one or more optimized results from the updated second planning graph to the robot 102 (e.g., move the robot).

Furthermore, in response to determining that the one or more optimized results, if any, from the updated second planning graph does not meet the satisfaction condition, the system may repeat the collision checking, updating the planning graph, performing the optimization on subsequent planning graphs until the system identifies a planning graph that meets the satisfaction condition. The system 200 may then apply a transition identified by one of the one or more optimized results from that identified planning graph to the robot 102. In some embodiments, determining whether optimized results from the updated planning graphs meets the satisfaction condition in such a process may include determining whether the optimization produces any collision-free paths. Such collision-free paths are paths that avoid collision with all obstacles in the environment.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, CD ROMs and computer memory.

The various embodiments described above can be combined to provide further embodiments. All of the commonly assigned US patent application publications, US patent applications, foreign patents, and foreign patent applications referred to in this specification and/or listed in the Application Data Sheet, including but not limited U.S. provisional patent application Ser. No. 62/626,939 filed Feb. 6, 2018; International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," and International Patent Application Publication No. WO 016/122840, filed Jan. 5, 2016, entitled "SPECIALIZED ROBOT MOTION PLANNING HARDWARE AND METHODS OF MAKING AND USING SAME" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based robot control system, the method comprising:

for a first robot that will operate in an environment, determining prior to a run time, by the robot control system, a plurality of planning graphs, each planning graph respectively comprising a plurality of nodes connected by a plurality of edges, each node which represents, implicitly or explicitly, variables that characterize a respective state of the first robot in a configuration space of the first robot, and each edge which represents a transition between a respective pair of the states of the first robot, where the respective pair of states are represented by respective ones of a pair of nodes that are coupled by a respective edge in the respective planning graph;

for at least two or more of the edges of each of the planning graphs, generating prior to the run time, by the robot control system, a respective set of edge information that represents a volume swept by at least a portion of the first robot in transitioning between the states represented by the respective nodes that are coupled by the respective edge;

storing prior to the run time, by the robot control system, the plurality of planning graphs and the sets of edge information in at least one nontransitory processor-readable storage;

based on at least a portion of the first robot having a first set of physical dimensions at a first time, providing, by the robot control system, the sets of edge information for a first one of the planning graphs to at least one processor; and based on at least a portion of the first robot having a second set of physical dimensions at a second time, at least one dimension in the second set of physical dimensions different than a corresponding one of the dimensions of the first set, providing, by the robot control system, the sets of edge information for a second one of the planning graphs to the at least one processor, and further comprising:

controlling the first robot during the run time period according to a first motion plan that is based on the first planning graph and the identifying of any of the edges of the first planning graph that the corresponding transition would result in a collision.

2. The method of claim 1 wherein the first robot has at least a first appendage that is selectively operable for movement with respect to the environment in which the first robot operates, and the first robot has a first end effector attached to the first appendage, the first end effector selectively operable for movement between at least a first and a second end effector arrangements, and further comprising:

determining, by the robot control system, that the first end effector attached to the first appendage is in a first end effector arrangement, wherein the first set of physical dimensions represent a set of dimensions of the first end effector in the first end effector arrangement; and wherein providing the sets of edge information for a first one of the planning graphs to at least one processor is in response to the determination that the first end effector attached to the first appendage is in the first end effector arrangement.

3. The method of claim 2, and further comprising:

determining, by the robot control system, that the first end effector attached to the first appendage is in a second end effector arrangement, wherein the second set of physical dimensions represents a set of dimensions of the first end effector in the second end effector arrangement; and wherein providing the sets of edge information for a second one of the planning graphs to at least one processor is in response to the determination that the first end effector attached to the first appendage is in the second end effector arrangement.

4. The method of claim 1 wherein the first robot has at least a first appendage that is selectively operable for movement with respect to the environment in which the first robot operates, and a first end effector is attached to the first appendage, the first end effector selectively operable for movement between at least an un-grasped arrangement and a grasped arrangement, at least one of a size or shape of a volume occupied by the first end effector in the grasped arrangement being different from at least one of a size or shape of a volume occupied by the first end effector in the un-grasped arrangement, and further comprising:

determining, by the robot control system, that the first end effector attached to the first appendage is in the un-grasped arrangement;

wherein providing the sets of edge information for a first one of the planning graphs to at least one processor is in response to the determination that the first end effector attached to the first appendage is in the un-grasped arrangement; and determining, by the robot control system, that the first end effector attached to the first appendage is in the grasped arrangement;

wherein providing the sets of edge information for a second one of the planning graphs to at least one processor is in response to the determination that the first end effector attached to the first appendage is in grasped arrangement.

5. The method of claim 1 wherein the first robot has at least a first appendage that is selectively operable for movement with respect to the environment in which the first robot operates, and, further comprising:

determining, by the robot control system, that the first robot has a first end effector attached to the first appendage, wherein the first set of physical dimensions represent a set of dimensions of the first end effector attached to the first appendage; and wherein providing the sets of edge information for a first one of the planning graphs to at least one processor is in response to the determination that the first robot has a first end effector attached to the first appendage.

6. The method of claim 5, further comprising:

determining, by the robot control system, that the first robot has a second end effector attached to the first appendage, the second end effector different from the first end effector in at least one of shape or size, wherein the second set of physical dimensions represent a set of dimensions of the second end effector attached to the first appendage; and wherein providing the sets of edge information for a second one of the planning graphs to at least one processor is in response to the determination that the first robot has a second end effector attached to the first appendage.

7. The method of claim 1 wherein the first robot is at least one of an autonomous or semi-autonomous vehicle, at least one of a size or shape of a volume occupied by the at least one of an autonomous or semi-autonomous vehicle in a first physical state is different from at least one of a size or shape of a volume occupied by the at least one of an autonomous or semi-autonomous vehicle in a second physical state, and further comprising:

determining, by the robot control system, that the at least one of an autonomous or semi-autonomous vehicle is in the first physical state;

wherein providing the sets of edge information for a first one of the planning graphs to at least one processor is in response to the determination that the at least one of an autonomous or semi-autonomous vehicle is in the first physical state; and determining, by the robot control system, that the at least one of an autonomous or semi-autonomous vehicle is in the second physical state;

wherein providing the sets of edge information for a second one of the planning graphs to at least one processor is in response to the determination that the at least one of an autonomous or semi-autonomous vehicle is in second physical state.

8. The method of claim 1 wherein providing the sets of edge information for a second one of the planning graphs to the at least one processor includes providing the sets of edge information for the second one of the planning graphs to the at least one processor during the run time, and controlling the first robot during the run time based on the sets of edge information for the second one of the planning graphs.

9. A method of operation in a processor-based robot control system, the method comprising:

for a first discretized representation of an environment in which at least a first robot will operate, the environment occupied by one or more obstacles, supplying, by the robot control system, at least a portion of the first discretized representation of the environment to at least one processor;

for each edge of a first planning graph of a plurality of configuration-space planning graphs stored in memory relative to the at least one processor, wherein each planning graph of the plurality of planning graphs is associated with a different set of physical dimensions of the first robot, providing, by the robot control system, a respective set of edge information to the at least one processor, the respective set of edge information which represents a volume swept by at least a portion of the first robot in transitioning between a pair of states of the first robot, the pair of states of the first robot represented by respective ones of a pair of nodes of the first planning graph, the respective pair of nodes which are coupled by a respective edge of the first planning graph, the respective edge which represents a transition between the respective pair of states of the first robot, wherein providing a respective set of edge information for each edge of the first planning graph to the at least one processor includes retrieving the respective set of edge information from a nontransitory storage during a run time period, the respective set of edge information which was stored to the nontransitory storage during a pre-run time period; and identifying, by the robot control system, any of the edges of the first planning graph that the corresponding transition would result in a collision between at least a portion of the robot and at least a portion of at least one of the one or more obstacles in the environment, and wherein providing a respective set of edge information to the at least one processor during the run time period includes, for each edge, applying the edge information for the respective edge to each of a plurality of circuits of the at least one processor in parallel during the run time period.

10. The method of claim 9, further comprising:
storing the first discretized representation of the environment in a memory on the at least one processor; and
after storing the first discretized representation of the environment in a memory on the at least one processor, receiving the set of edge information by the at least one processor from a storage that is separate from the at least one processor.

11. A method of operation in a processor-based robot control system, operation in a processor-based robot control system comprising:
for a first discretized representation of an environment in which at least a first robot will operate, the environment occupied by one or more obstacles, supplying, by the robot control system, at least a portion of the first discretized representation of the environment to at least one processor;
for each edge of a first planning graph of a plurality of configuration-space planning graphs stored in memory relative to the at least one processor, wherein each planning graph of the plurality of planning graphs is associated with a different set of physical dimensions of the first robot, providing, by the robot control system, a respective set of edge information to the at least one processor, the respective set of edge information which represents a volume swept by at least a portion of the first robot in transitioning between a pair of states of the first robot, the pair of states of the first robot represented by respective ones of a pair of nodes of the first planning graph, the respective pair of nodes which are coupled by a respective edge of the first planning graph, the respective edge which represents a transition between the respective pair of states of the first robot, wherein providing a respective set of edge information for each edge of the first planning graph to the at least one processor includes retrieving the respective set of edge information from a nontransitory storage during a run time period, the respective set of edge information which was stored to the nontransitory storage during a pre-run time period; and
identifying, by the robot control system, any of the edges of the first planning graph that the corresponding transition would result in a collision between at least a portion of the robot and at least a portion of at least one of the one or more obstacles in the environment, wherein providing a respective set of edge information to the at least one processor during the run time period includes, for each edge, applying to circuits of the at least one processor a respective set of edge information that represents, in terms of rectangular prisms, a volume swept by at least a portion of the first robot in transitioning between the states represented by the respective nodes that are coupled by the respective edge, the units of volume which each cover two or more voxels.

12. A method of operation in a processor-based robot control system, operation in a processor-based robot control system further comprising:
for a first discretized representation of an environment in which at least a first robot will operate, the environment occupied by one or more obstacles, supplying, by the robot control system, at least a portion of the first discretized representation of the environment to at least one processor;
for each edge of a first planning graph of a plurality of configuration-space planning graphs stored in memory relative to the at least one processor, wherein each planning graph of the plurality of planning graphs is associated with a different set of physical dimensions of the first robot, providing, by the robot control system, a respective set of edge information to the at least one processor, the respective set of edge information which represents a volume swept by at least a portion of the first robot in transitioning between a pair of states of the first robot, the pair of states of the first robot represented by respective ones of a pair of nodes of the first planning graph, the respective pair of nodes which are coupled by a respective edge of the first planning graph, the respective edge which represents a transition between the respective pair of states of the first robot, wherein providing a respective set of edge information for each edge of the first planning graph to the at least one processor includes retrieving the respective set of edge information from a nontransitory storage during a run time period, the respective set of edge information which was stored to the nontransitory storage during a pre-run time period; and
identifying, by the robot control system, any of the edges of the first planning graph that the corresponding transition would result in a collision between at least a portion of the robot and at least a portion of at least one of the one or more obstacles in the environment;
determining, by the robot control system, that the first robot will or has changed from a first arrangement to a second arrangement, the second arrangement different from the first arrangement;
for each edge of a second planning graph of the plurality of planning graphs, providing, by the robot control system, a respective set of edge information to the at least one processor, the respective set of edge information which represents a volume swept by at least a portion of the first robot in transitioning between a pair of states of the first robot, the pair of states of the first robot represented by respective ones of a pair of nodes of the second planning graph, the respective pair of nodes which are coupled by a respective edge of the second planning graph, the respective edge which represents a transition between the respective pair of states of the first robot, the second planning graph different from the first planning graph, wherein the providing a respective set of edge information for each edge of the second planning graph to the at least one processor includes retrieving the respective set of edge information from a nontransitory storage during the run time period, the respective set of edge information which was stored to the nontransitory storage during the pre-run time period; and
identifying, by the robot control system, any of the edges of the second planning graph that the corresponding transition would result in a collision between at least a portion of the robot and at least a portion of at least one of the one or more obstacles in the environment,
controlling the first robot during the run time period according to a second motion plan that is based on the second planning graph and the identifying of any of the edges of the first planning graph that the corresponding transition would result in a collision.

13. The method of claim 12 wherein the first robot includes a first appendage that is selectively operable for movement with respect to the environment in which the first robot operates, and determining, by the robot control system, that the first robot will or has changed from a first arrangement to a second arrangement includes determining that a second end effector is attached or being attached to the first appendage in place of a first end effector.

14. The method of claim 12 wherein the first robot is at least one of an autonomous or semi-autonomous vehicle, at least one of a size or shape of a volume occupied by the at least one of an autonomous or semi-autonomous vehicle in a first arrangement is different from at least one of a size or shape of a volume occupied by the at least one of an autonomous or semi-autonomous vehicle in the second arrangement, and wherein determining that the first robot will or has changed from a first arrangement to a second arrangement includes determining that the at least one of an autonomous or semi-autonomous vehicle is transitioning or has transitioned between in the first and the second arrangements of the at least one of an autonomous or semi-autonomous vehicle.

15. A method of operation in a processor-based robot control system, the method comprising:

for a first discretized representation of an environment in which at least a first robot will operate, the environment occupied by one or more obstacles, supplying, by the robot control system, at least a portion of the first discretized representation of the environment to at least one processor;

for each edge of a first planning graph of a plurality of configuration-space planning graphs stored in memory relative to the at least one processor, wherein each planning graph of the plurality of planning graphs is associated with a different set of physical dimensions of the first robot, providing, by the robot control system, a respective set of edge information to the at least one processor, the respective set of edge information which represents a volume swept by at least a portion of the first robot in transitioning between a pair of states of the first robot, the pair of states of the first robot represented by respective ones of a pair of nodes of the first planning graph, the respective pair of nodes which are coupled by a respective edge of the first planning graph, the respective edge which represents a transition between the respective pair of states of the first robot, wherein providing a respective set of edge information for each edge of the first planning graph to the at least one processor includes retrieving the respective set of edge information from a nontransitory storage during a run time period, the respective set of edge information which was stored to the nontransitory storage during a pre-run time period; and identifying, by the robot control system, any of the edges of the first planning graph that the corresponding transition would result in a collision between at least a portion of the robot and at least a portion of at least one of the one or more obstacles in the environment, wherein the at least one processor is at least one of a field programmable gate array or application specific integrated circuit, and providing the respective set of edge information to at least one processor includes applying the edge information for one of the edges to each of a plurality of circuits of the at least one processor implemented in the at least one of a field programmable gate array or application specific integrated circuit.

* * * * *